(12) United States Patent
Miyaki et al.

(10) Patent No.: US 7,105,251 B2
(45) Date of Patent: *Sep. 12, 2006

(54) NONAQUEOUS SECONDARY BATTERY

(75) Inventors: Yukio Miyaki, Kanagawa (JP); Masuo Kabutomori, Kanagawa (JP); Noriyuki Inoue, Kanagawa (JP); Hiroshi Ishizuka, Kanagawa (JP); Toshiaki Aono, Kanagawa (JP); Mikihiko Kato, Kanagawa (JP); Hideki Tomiyama, Kanagawa (JP)

(73) Assignee: Ube Industries, Ltd., Yamaguchi (JP)

( * ) Notice: Subject to any disclaimer, the term of this patent is extended or adjusted under 35 U.S.C. 154(b) by 317 days.

This patent is subject to a terminal disclaimer.

(21) Appl. No.: 10/046,708

(22) Filed: Jan. 17, 2002

(65) Prior Publication Data

US 2002/0114993 A1   Aug. 22, 2002

Related U.S. Application Data

(63) Continuation of application No. 08/981,011, filed as application No. PCT/JP96/01788 on Jun. 27, 1996, now Pat. No. 6,365,299.

(30) Foreign Application Priority Data

| Jun. 28, 1995 | (JP) | ................................. 7-183233 |
| Jul. 11, 1995 | (JP) | ................................. 7-174861 |
| Jul. 25, 1995 | (JP) | ................................. 7-189190 |
| Feb. 15, 1996 | (JP) | ................................. 8-027658 |

(51) Int. Cl.
*H01M 4/48* (2006.01)
*H01M 2/16* (2006.01)
*H01M 10/40* (2006.01)

(52) U.S. Cl. .................. 429/218.1; 429/137; 429/232; 429/246; 429/251

(58) Field of Classification Search ........ 429/131–133, 429/136, 137, 212, 214–216, 218.1, 231.95, 429/232, 246–248, 251
See application file for complete search history.

(56) References Cited

U.S. PATENT DOCUMENTS

| 5,618,640 | A |  | 4/1997 | Idota et al. |
| 5,665,491 | A |  | 9/1997 | Tomiyama et al. |
| 5,705,291 | A |  | 1/1998 | Amatucci et al. |
| 5,824,434 | A |  | 10/1998 | Kawakami et al. |
| 5,869,208 | A |  | 2/1999 | Miyasaka |
| 6,365,299 | B1 | * | 4/2002 | Miyaki et al. ........... 429/218.1 |

FOREIGN PATENT DOCUMENTS

| JP | 59-173977 |   | 10/1984 |
| JP | 4-28171 |   | 1/1992 |
| JP | 4-28172 | * | 1/1992 |
| JP | 4-206168 |   | 7/1992 |
| JP | 4-237948 |   | 8/1992 |
| JP | 6-36759 |   | 2/1994 |
| JP | 6-36800 |   | 2/1994 |
| JP | 6-168739 |   | 6/1994 |
| JP | 6-188030 |   | 7/1994 |
| JP | 6-275268 |   | 9/1994 |
| JP | 6-338325 |   | 12/1994 |

* cited by examiner

*Primary Examiner*—Jonathan Crepeau
(74) *Attorney, Agent, or Firm*—Sughrue Mion, PLLC

(57) ABSTRACT

A nonaqueous secondary battery comprising a positive electrode and a negative electrode both containing a material capable of reversibly intercalating and deintercalating lithium, a nonaqueous electrolyte containing a lithium salt, and a separator, which has a least one protective layer on the negative electrode and/or the positive electrode. The battery has a high discharge potential, satisfactory charge and discharge cycle characteristics, and high safety.

19 Claims, 1 Drawing Sheet

FIGURE

NONAQUEOUS SECONDARY BATTERY

This is a continuation of application Ser. No. 08/981,011 filed Dec. 24, 1997, which is a 371 Application of PCT Application No. PCT/JP96/01788 filed Jun. 27, 1996, now U.S. Pat. No. 6,365,299; the above noted prior applications are all hereby incorporated by reference.

TECHNICAL FIELD

This invention relates to a nonaqueous secondary battery which has a high discharge potential, a long life, and excellent safety and which can be produced with improved productivity.

BACKGROUND ART

JP-A-61-7577 (the term "JP-A" as used herein means an "unexamined published Japanese patent application") discloses a positive electrode having a protective layer comprising a substance having electron conductivity combined with ionic conductivity (e.g., lithium ion conductivity), giving an oxide of tungsten, molybdenum or vanadium as a preferred example of the substance having electron and ion conductivity. However, the compounds enumerated have not achieved sufficient effects in preventing internal short-circuits.

JP-A-4-28173 discloses providing a polymer film which selectively transmits an alkali metal ion on the surface of a negative electrode made of an alkali metal or an alkali metal alloy countering to a positive electrode. However, use of such a porous polymer film is fraught with the problem that the battery capacity may be greatly reduced.

Accordingly, an object of the present invention is to improve productivity in the production of a nonaqueous secondary battery having a high discharge voltage, satisfactory charge and discharge cycle characteristics, and excellent safety.

BRIEF SUMMARY OF THE INVENTION

The object of the present invention has been accomplished by the following nonaqueous secondary batteries.
(1) A nonaqueous secondary battery comprising a positive electrode and a negative electrode both containing a material capable of reversibly intercalating and deintercalating lithium, and a nonaqueous electrolyte containing a lithium salt, wherein at least one of the negative electrode and positive electrode has at least one protective layer containing at least one inorganic oxide selected from the group consisting of alumina, silicon dioxide and zirconia.
(2) A nonaqueous secondary battery comprising a positive electrode and a negative electrode both containing a material capable of reversibly intercalating and deintercalating lithium, and a nonaqueous electrolyte containing a lithium salt, wherein at least one of the negative electrode and positive electrode has at least one protective layer containing organic fine particles.
(3) A nonaqueous secondary battery comprising a positive electrode containing a material capable of reversibly intercalating and deintercalating lithium, a negative electrode containing at least one oxide selected from the group consisting of a metal or semimetal oxide belonging to the groups 13 to 15 of the Periodic Table which is capable of reversibly intercalating and deintercalating lithium, a nonaqueous electrolyte containing a lithium salt, and a separator, wherein at least one of the negative electrode and positive electrode has at least one protective layer.

BRIEF DESCRIPTION OF THE DRAWINGS

The numerical references used in the FIGURE indicate the following members:
8 . . . Positive sheet electrode
9 . . . Negative sheet electrode
10 . . . Separator
11 . . . Battery case
12 . . . Cap
13 . . . Gasket
14 . . . Explosion-proof valve

DETAILED DESCRIPTION OF THE INVENTION

The inventors have extensively investigated the cause of the poor yield in the production of nonaqueous secondary batteries comprising a positive electrode and a negative electrode both containing a material capable of reversibly intercalating and deintercalating lithium, a nonaqueous electrolyte containing a lithium salt, and a separator. As a result, they have found that projections on the surface of the electrodes, scratches on the surface of the electrodes that occur during steps from transportation to assembly into batteries, and unevenness due to partial fall-off are the causes. These causes lead to destruction of the separator during rolling either directly or in combination with slight sliding or uneven application of pressure during rolling, thereby greatly contributing to internal short-circuits.

It has been ascertained that such the short-circuits are effectively prevented by providing a protective layer on the surface of the electrode and that provision of a metal salt- or alkaline earth metal salt-containing protective layer, and an organic fine particles-containing protective layer. These protective layers will be explained below.

The protective layer according to the present invention includes an electrically insulating protective layer, an electrically conducting protective layer, an alkali metal salt- or alkaline earth metal salt-containing protective layer, and an organic fine particles-containing protective layer. These protective layers will be explained below.

The protective layer of the invention comprises at least one layer and may be composed of plural layers of a same or different kinds. The protective layer preferably has a thickness of 1 to 40 μm, more preferably 2 to 30 μm.

[Insulating Protective Layer]

The electrically insulating protective layer used in the invention is a layer having substantially no electron conductivity, i.e., an insulating layer. Where the insulating protective layer comprises a plurality of layers, at least the outermost layer should be insulating. It is not desirable for the protective layer containing particles to melt or form another film at 300° C. or less. The protective layer preferably contains insulating organic or inorganic fine particles. The fine particles preferably have a particle size of 0.1 to 20 μm, particularly 0.2 to 15 μm.

Preferred organic fine particles are powdered cross-linked latex or fluorine resins. Those having a glass transition point of 250 to 350° C. and undergoing no decomposition nor film formation are preferred. Fine particles of Teflon are more preferred.

Examples of inorganic fine particles include carbides, silicides, nitrides, sulfides or oxides or metals or nonmetals.

Of carbides, suicides and nitrides preferred are SiC, aluminum nitride (AlN), BN, and BP for their high insulating properties and chemical stability. SiC prepared by using BeO, Be or BN as a sintering aid is particularly preferred.

Inorganic chalcogenide particles may be also used among inorganic particles. Oxides, especially those hardly susceptible to oxidation or reduction are preferred chalcogenides. For example, chalcogenides containing at least one of oxides of sodium, potassium, magnesium, calcium, strontium, zirconium, aluminum, and silicon can be used. Specific examples thereof include $Al_2O_3$, $As_4O_6$, $B_2O_3$, $BaO$, $BeO$, $CaO$, $Li_2O$, $K_2O$, $Na_2O$, $In_2O_3$, $MgO$, $Sb_2O_5$, $SiO_2$, $SrO$, and $ZrO_2$; with $Al_2O_3$, $BaO$, $BeO$, $CaO$, $K_2O$, $Na_2O$, $MgO$, $SiO_2$, $SrO$, and $ZrO_2$ being particularly preferred. Still preferred of them are $Al_2O_3$, $SiO_2$, and $ZrO_2$. These oxides can be either a single oxide or a composite oxide. Preferred composite oxides include mullite ($3Al_2O_3.2SiO_2$), steatite ($MgO.SiO_2$), forsterite ($2MgO.SiO_2$), and cordierite ($2MgO.2Al_2O_3.5SiO_2$).

$TiO_2$ is also useful.

These inorganic compound particles are used with their particle size adjusted in the range of from 0.1 to 20 μm, preferably from 0.2 to 15 μm, by controlling the conditions of preparation or grinding.

The particles are used in an amount of 1 to 80 g/m², preferably 2 to 40 g/m².

The insulating protective layer is formed by using the above-described electrically insulating particles having substantially no electrical conductivity in combination with a binder. The binder used here can be the one used in formation of an electrode material mixture hereinafter described. The particles with no conductivity is preferably used in a proportion of 40 to 96% by weight, particularly 50 to 92% by weight, based on the total weight of the particles and the binder.

[Electrically Conducting Protective Layer]

The electrically conducting protective layer for use in the invention comprises water-insoluble fine conductive particles and a binder. The binder to be used can be the one used in formation of an electrode material mixture hereinafter described. The content of the fine conductive particles in the conducting protective layer is preferably 2.5 to 96% by weight, more preferably 5 to 95% by weight, particularly preferably 10 to 93% by weight.

Examples of the water-insoluble fine conductive particles include metals, metal oxides, metallic fibers, carbon fiber, carbon black, and graphite. They preferably have a water solubility of not higher than 100 ppm, and are more preferably insoluble in water. Of these water-insoluble fine conductive particles preferred are those having low reactivity to alkali metals, especially lithium. Metal particles and carbon particles are more preferred. It is preferable for the element constituting the particles to have an electrical resistivity of not higher than $5 \times 10^9$ Ω·m at 20° C.

Examples of the fine metal particles preferably include those having low reactivity to lithium, i.e, those hardly forming an alloy with lithium, such as copper, nickel, iron, chromium, molybdenum, titanium, tungsten, and tantalum. The fine metal particles can be acicular, columnar, tabular or lumpy, preferably with a maximum diameter of 0.02 to 20 μm, particularly 0.1 to 10 μm. It is desirable for the fine metal particles not to be oxidized to an excessive degree on their surface. If they have an oxidized surface, they are preferably heat-treated in a reducing atmosphere.

The carbon particles to be used can be any of well-known carbon material that has been used as a conductive material in combination with a non-conductive active material. Such the materials include carbon black species, e.g., thermal black, furnace black, channel black, and lamp black; natural graphite species, e.g., flaky graphite, scale graphite, and earthy graphite; artificial graphite; and carbon fiber. For dispersive mixing with a binder, a combination of carbon black and graphite is used for preference. Acetylene black or Ketjen black is a preferred carbon black species. The carbon particles preferably have a particle size of 0.01 to 20 μm, particularly 0.02 to 10 μm.

The conducting protective layer can contain particles having substantially no electrical conductivity for the purpose of improving strength and the like. Examples of such the particles include Teflon fine powder, SiC, aluminum nitride, alumina, zirconia, magnesia, mullite, forsterite, and steatite. These particles are preferably used in an amount 0.01 to 10 times the conductive particles.

[Alkali Metal Salt- or Alkaline Earth Metal Salt-Containing Protective Layer]

The alkali metal salt- or alkaline earth metal salt-containing protective layer according to the present invention contains particles of water-insoluble or sparingly water-soluble alkali metal salt or alkaline earth metal salt (exclusive of chalcogenides) and a binder. These particles preferably have a particle size of 0.02 to 20 μm, particularly 0.05 to 10 μm.

Preferable examples of the alkali metal include lithium, sodium, and potassium, with lithium being particularly preferred. Preferable examples of the alkaline earth metals include magnesium, calcium, strontium, and barium, with magnesium and calcium being particularly preferred. Preferable examples of salts of these metals include fluorides, phosphates, carbonates, silicates, borates, oxalates, and acetates. Lithium fluoride is a particularly preferred alkali metal salt. Particularly preferred alkaline earth metal salts are magnesium fluoride, magnesium carbonate, magnesium silicate, calcium fluoride, calcium carbonate, and calcium silicate.

[Organic Fine Particles-containing Protective Layer]

The fine particles in the organic fine particles-containing protective layer according to the invention perform the following function. The internal temperature of a battery rises in case of a short-circuit for some cause. If the internal temperature reaches the minimum film-forming temperature (MFT) of the organic fine particles, the particles partially melt to fill the pores in the protective layer to shut down the permeation of the electrolytic solution (this action is called SD). While a combined use of a separator could bring about further improved safety, it is possible in this case to omit the separator because the protective layer containing the organic fine particles serves as a separator, which will make it feasible to improve safety, reduce the cost, and increase the electric capacity with an increase in number of turns in rolling sheet electrodes.

Preferred organic fine particles are those insoluble in an electrolytic solution and having an MFT (minimum film-forming temperature) of 80 to 200° C., still preferably 90 to 180° C., particularly preferably 110 to 170° C. The protective layer contains at least one kind of such organic fine particles.

Monomers useful in the synthesis of polymers which constitute the organic fine particles for use in the invention include ethylene, propylene, acrylonitrile, acrylic esters, methacrylic esters, crotonic esters, vinyl esters, maleic diesters, fumaric diesters, itaconic diesters, acrylamides, methacrylamides, vinyl ethers, styrene and derivatives thereof, and dienes.

Specific examples of these monomers are listed below.

Examples of the acrylic acid esters include methyl acrylate, ethyl acrylate, n-propyl acrylate, isopropyl acrylate, n-butyl acrylate, isobutyl acrylate, tert-butyl acrylate, hexyl acrylate, 2-ethylhexyl acrylate, acetoxyethyl acrylate, phenyl acrylate, 2-methoxyacrylate, 2-ethoxyacrylate, 2-(2-methoxyethoxy)ethyl acrylate.

Examples of the methacrylic acid esters include methyl methacrylate, ethyl methacrylate, n-propyl methacrylate, n-butyl methacrylate, tert-butyl methacrylate, cyclohexyl methacrylate, 2-hydroxyethyl methacrylate, and 2-ethoxyethyl methacrylate.

Examples of the crotonic acid esters include butyl crotonate and hexyl crotonate.

Examples of the vinyl esters include vinyl acetate, vinyl propionate, vinyl butyrate, vinyl methoxyacetate, and vinyl benzoate.

Examples of the maleic acid diesters include diethyl maleate, dimethyl maleate, and dibutyl maleate.

Examples of the fumaric acid diesters include diethyl fumarate, dimethyl fumarate, and dibutyl fumarate.

Examples of the itaconic acid diesters include diethyl itaconate, dimethyl itaconate, and dibutyl itaconate.

Examples of the acrylamides include acrylamide, methylacrylamide, ethylacrylamide, propylacrylamide, n-butylacrylamide, tert-butylacrylamide, cyclohexylacrylamide, 2-methoxyethylacrylamide, dimethylacrylamide, diethylacrylamide, and phenylacrylamide.

Examples of the methacrylamides include methylmethacrylamide, ethylmethacrylamide, n-butylmethacrylamide, tert-butylmethacrylamide, 2-methoxymethacrylamide, dimethylmethacrylamide, and diethylmethacrylamide.

Examples of the vinyl ethers include methyl vinyl ether, butyl vinyl ether, hexyl vinyl ether, methoxyethyl vinyl ether, and dimethylaminoethyl vinyl ether.

Examples of the styrene and its derivatives include styrene, methylstyrene, dimethylstyrene, trimethylstyrene, ethylstyrene, isopropylstyrene, butylstyrene, chloromethylstyrene, methoxystyrene, butoxystyrene, acetoxystyrene, chlorostyrene, dichlorostyrene, bromostyrene, methyl vinylbenzoate, and 2-methylstyrene.

Examples of the dienes include butadiene, isoprene, chloroprene, cyclopentadiene and derivatives thereof, dicyclopentadiene and derivatives thereof, cyclohexadiene, and norbornadiene.

The polymer used as the organic fine particles may be a copolymer of the above-enumerated monomers.

Additional polymers useful as the organic fine particles include vinyl chloride resins, vinylidene chloride resins, fluorine resins (e.g., polyvinylidene fluoride, polyvinyl fluoride, polychlorotrifluoroethylene, and copolymers containing them), acetal resins, polyester resins (polyesters obtained by condensation of a dicarboxylic acid, such as terephthalic acid, isophthalic acid or succinic acid, which may be substituted with a sulfonic acid group, a carboxyl group, etc., with ethylene glycol, diethylene glycol, propylene glycol, neopentyl glycol, bisphenol A, etc.), polycarbonate resins, polyamide resins (e.g., nylon 46, 6, 7, 11, 12, 66, 610, 612, 11 or 22), polyurethane resins (e.g., polymers obtained by polyaddition reaction or polymerization reaction between a polyisocyanate, such as tolylene diisocyanate, diphenylmethane diisocyanate, polymethylenepolyphenylene polyisocyanate, tolidine diisocyanate, naphthalene diisocyanate, hexamethylene diisocyanate, xylylene diisocyanate, or dicyclohexylmethane diisocyanate, and a polyol, such as polyoxypropylene polyol, polyether polyol, polyoxytetramethylene glycol, polyadipate polyol, polycaprolactone diol, polycarbonate polyol, polybutadiene polyol, or polyacrylate polyol), urea resins, polysulfone resins, polycaprolactone resins, styrene, and styrene-maleic anhydride resins.

The polymers used as organic fine particles may be random, block or graft copolymers of the monomers composing the polymers listed above.

The polymers for use as organic fine particles are not limited, provided that they-have a melting point of not lower than 50° C. (preferably 80 to 250° C., still preferably 100 to 200° C.) and do not dissolve in an electrolytic solution.

Polyolefins and fluorine resins are preferred for use as the organic fine particles of the present invention.

The protective layer comprises at least organic fine particles or a combination of the organic fine particles and inorganic fine particles as described below.

Useful inorganic particles include carbides, silicides, nitrides, sulfides, oxides, and silicates of metals or nonmetal element.

Among carbides, silicides and nitrides preferred are SiC, aluminum nitride (ANN), BN, and BP for their high insulating properties and chemical stability. SiC prepared by using BeO, Be or BN as a sintering aid is particularly preferred.

Of chalcogenide oxides, especially oxides which are hardly subjected to oxidation or reduction are preferred. Examples of such oxides include $Al_2O_3$, $As_4O_6$, $B_2O_3$, BaO, BeO, CaO, $Li_2O$, $K_2O$, $Na_2O$, $In_2O_3$, MgO, $Sb_2O_5$, $SiO_2$, SrO, and $ZrO_2$; with $Al_2O_3$, BaO, BeO, CaO, $K_2O$, $Na_2O$, MgO, $SiO_2$, SrO, and $ZrO_2$ being particularly preferred. These oxides can be either a simple oxide or a composite oxide. Preferred examples of the composite oxides include mullite ($3Al_2O_3.2SiO_2$), steatite ($MgO.SiO_2$), forsterite ($2MgO.SiO_2$), and cordierite ($2MgO.2Al_2O_3.5SiO_2$). Examples of the silicates include aluminum silicate, zinc silicate, calcium silicate, and zirconium silicate.

Since the organic fine particles also serve as a binder, a binder is not always necessary, but a separate binder can be used depending on the kind of the organic fine particles or inorganic fine particles used. The binder to be used here can be the one used in forming an electrode material mixture hereinafter described. The fine particles are used in a total proportion of 50% by weight or more, preferably 60% by weight or more, still preferably 70% by weight or more, based on the total weight of the particles and the binder.

The protective layer can be provided on either one of or both of a positive electrode and a negative electrode. Where a positive or negative electrode is formed by applying an electrode material mixture on both sides of a current collector, the protective layer can be provided on one or both sides of the electrode. Note that the protective layer should be provided on at least one of a positive electrode and a negative electrode that are countering each other via a separator.

The protective layer can be formed successively or simultaneously by applying an electrode material mixture containing a material capable of reversibly intercalating and deintercalating lithium onto a current collector.

The positive or negative electrode which can be used in the nonaqueous secondary battery of the present invention can be formed by applying a positive or negative electrode material mixture on a current collector. The positive or negative electrode material mixture can contain a positive electrode active material or a negative electrode material, respectively, and, in addition, various additives, such as an (electron) conductive agent, a binder, a dispersant, a filler, an ion conductive agent, a pressure increasing agent, and the like.

The negative electrode material for use in the invention can be any of substances capable of intercalating and deintercalating light metal ions. Examples of the substances include light metals, light metal alloys, carbonaceous compounds, inorganic oxides, inorganic chalcogenides, metal complexes, and organic polymers. Carbonaceous compounds, inorganic oxides, and inorganic chalcogenides are preferred. These materials can be used as a combination thereof. For example, a combination of a light metal and a carbonaceous compound, a combination of a light metal and an inorganic oxide, or a combination of a light metal, a carbonaceous compound, and an inorganic oxide can be used. These negative electrode materials are preferred because they bring about such effects as a high capacity, a high discharge potential, high safety, and excellent cycle properties. The light metal ions preferably are a lithium ion.

The light metal preferably is lithium. Examples of the light metal alloys include those containing a metal capable of forming an alloy with lithium and those containing lithium. Al, Al—Mn, Al—Mg, Al—Sn, Al—In, and Al—Cd are particularly preferred.

Metallic compounds preferably include the following metal oxides and metal chalcogenides and, in addition, silicides, such as FeSi, $Fe_2Si_3$, and $FeSi_2$, as described in JP-A-5-159780 and carbides and nitrides, such as SiC, VC, $Co_2C$, SiN, SnN, and MoN, as described in JP-A-6-290782.

The carbonaceous compound is selected from natural graphite, artificial graphite, vapor phase growth carbon, carbon of calcined organic substances, and the like, with those having a graphite structure being preferred. The carbonaceous compound may contain, in addition to carbon, 0 to 10% by weight of foreign elements or compounds thereof, e.g., B, P, N, S, SiC and $B_4C$.

Elements which constitute the oxides or chalcogenides include transition metals and the metals and semimetals belonging to the groups 13 to 15 of the Periodic Table.

Examples of the transition metal compounds preferably include a single oxide, a composite oxide or a chalcogenide of V, Ti, Fe, Mn, Co, Ni, Zn, W, and Mo. More preferred compounds are $Li_pCo_qV_{1-q}O_r$, wherein p=0.1 to 2.5, q=0 to 1; and r=1.3 to 4.5, which are disclosed in JP-A-6-44972.

Examples of the compounds of semimetals or metals other than the transition metals include oxides and chalcogenides of the elements of the groups 13 to 15 of the Periodic Table (e.g., Ga, Si, Sn, Ge, Pb, Sb, and Bi) or a combination of two or more of these elements. For example, $Ga_2O_3$, SiO, GeO, $GeO_2$, SnO, $SnO_2$, $SnSiO_3$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $SnSiO_3$, GeS, $GeS_2$, SnS, $SnS_2$, PbS, $PbS_2$, $Sb_2O_3$, $Sb_2S_5$, and $SnSiS_3$ are preferred. These compounds may be Li-containing composite oxides, such as $Li_2GeO_3$ and $Li_2SnO_2$.

It is preferable for the complex chalcogenides and composite oxides be predominantly amorphous at the time of assembly into a battery. The terminology "predominantly amorphous" as used herein means that a substance has a broad scattering band having a peak at 20 to 40° in terms of 2θ value in X-ray diffractometry using CuKα rays. The substance may also exhibit a diffraction line assigned to a crystalline structure. It is preferable that the maximum intensity of the band assigned to a crystalline structure which appears at 40 to 70° in terms of 2θ value is not higher than 500 times, more preferably not higher than 100 times, particularly preferably not higher than 5 times, the peak intensity of the broad scattering band which appears at 20 to 40° in terms of 2θ value. It is most preferred that the compound has no diffraction line attributed to a crystalline structure.

The above-mentioned composite chalcogenides and composite oxides are preferably those comprising three or more elements selected from B, Al, Ga, In, Tl, Si, Ge, Sn, Pb, P, As, Sb, and Bi. Composite oxides are more preferred.

Composite oxides made up of three or more elements selected from B, Al, Si, Ge, Sn, and P are particularly preferred. These composite oxides may contain an element of the groups 1 to 3 of the Periodic Table or a halogen element chiefly for modification of the amorphous structure.

Amorphous composite oxides mainly comprising tin represented by formula (1) shown below are particularly preferred among the above-described negative electrode materials.

$$SnM^1_aO_t \qquad (1)$$

wherein $M^1$ represents two or more elements selected from the group consisting of Al, B, P, Si, Ge, elements of groups 1 to 3 of the Periodic Table, and halogen elements; a represents a number of from 0.2 to 2; and t represents a number of from 1 to 6.

Of the compounds of formula (1) more preferred are those represented by formula (2):

$$SnM^2_bO_t \qquad (2)$$

wherein $M^2$ represents two or more elements selected from the group consisting of Al, Br P, elements of groups 1 to 3 of the Periodic Table, and halogen elements; b represents a number of from 0.2 to 2; and t represents a number of from 1 to 6.

Of the compounds of formula (1), those represented by formula (3) shown below are particularly preferred.

$$SnM^3_cM^4_dO_t \qquad (3)$$

wherein $M^3$ represents at least two elements selected from the group consisting of Al, B, P, and Si; $M^4$ represents at least one element selected from the group consisting of elements of groups 1 to 3 of the Periodic Table and halogen elements; c represents a number of from 0.2 to 2; d represents a number of from 0.01 to 1; provided that 0.2<c+d<2; and t represents a number of from 1 to 6.

$M^3$ and $M^4$ are elements for making the compound of formula (3) amorphous as a whole. $M^3$ is an element capable of taking an amorphous state and is preferably a combination of two or more of Al, B, P, and Si. $M^4$ is an element capable of modifying the amorphous state selected from elements of groups 1 to 3 of the Periodic Table and halogen elements, and is preferably K, Na, Cs, Mg, Ca, Ba, Y or F. c is a number of from 0.2 to 2, and d is a number of from 0.01 to 1, provided that 0.2<c+d<2. t represents a number of from 1 to 6.

The amorphous composite oxides used in the invention can be synthesized by either a calcining process or a solution process. A calcining process is more preferred. In a calcining process, oxides or compounds of the elements shown in formula (1) are mixed well and calcined to obtain an amorphous composite oxide.

Calcining is carried out preferably at a rate of temperature rise of 5° to 200° C./min, at a calcining temperature of 500° to 1500° C. for a calcining time of 1 to 100 hours. The rate of temperature drop is preferably 2 to $10^{7°}$ C./min.

The term "rate of temperature rise" as used herein means an average rate of temperature rise of from 50% of the calcining temperature (° C.) to 80% of the calcining temperature (° C.), and the term "rate of temperature drop" as used herein means an average rate of temperature drop of from 80% of the calcining temperature (° C.) to 50% of the calcining temperature (° C.).

Cooling can be effected either within a kiln or out of the kiln, for example, by pouring the product into water. Ultrarapid cooling methods described in *Ceramics Processing*, p. 217, Gihodo (1987), such as a gunning method, a Hammer-Anvil method, a slap method, a gas atomizing method, a plasma spraying method, a centrifugal quenching method, and a melt drag method, can also be used. Further, cooling may be conducted by a single roller quenching method or a twin roller quenching method described in *New Glass Handbook*, p. 172, Maruzen (1991). Where the material melts during calcining, the calcined product may be withdrawn continuously while feeding the raw materials to the kiln. Where the material melts during calcining, the melt is preferably stirred.

The calcining atmosphere preferably has an oxygen content of not more than 5% by volume. An inert gas atmosphere is more preferred. Suitable inert gases include nitrogen, argon, helium, krypton, and xenon. The most preferred inert gas is pure argon.

In carrying out the calcining to prepare an oxide negative electrode material, it is preferable to control the oxygen partial pressure of the atmosphere. A preferred oxygen partial pressure, while decided appropriately according to the material, is from 1 to 20 in terms of $-\log(PO_2/atm)$. A partial oxygen pressure can be measured with an oxygen sensor using stabilized zirconia. The atmosphere can be an appropriate mixture of $H_2$, $H_2O$, CO, $CO_2$, Ar, He, Kr, Xe, $N_2$, $O_2$, etc.

The negative electrode material can be subjected to heat treatment after synthesis or after calcining and grinding. The heating temperature and atmosphere are not particularly limited and are selected appropriately according to the material. A suitable temperature is 100 to 800° C., preferably 100 to 500° C. A suitable atmosphere has a $-\log(PO_2/atm)$ of 0 to 18. A mixed gas of CO, $CO_2$, $H_2$, $H_2O$, Ar, He, $N_2$, etc. can be used. The partial oxygen pressure of the atmosphere is measured with an oxygen sensor using stabilized zirconia.

The compound used in the present invention preferably has an average particle size of 0.1 to 60 µm. For particle size adjustment, well-known grinding machines and classifiers, such as a mortar, a ball mill, a sand mill, a vibration mill, a satellite ball mill, a planetary ball mill, spinning air flow type jet mill, and a sieve, can be used. If necessary, the grinding can be conducted by wet grinding in the presence of water or an organic solvent, such as methanol. In order to adjust to a prescribed size, the ground particles are preferably classified. The manner of classification is not particularly limited, and a sieve, an air classifier, etc. can be used appropriately. Classification is carried out either in a dry process or a wet process.

Specific but non-limiting examples of the negative electrode materials useful in the present invention are shown below.

$SnAl_{0.1}B_{0.3}P_{0.4}K_{0.2}O_{2.7}$,
$SnAl_{0.1}B_{0.3}P_{0.4}Na_{0.2}O_{2.7}$,
$SnAl_{0.1}B_{0.3}P_{0.4}Rb_{0.2}O_{2.7}$,
$SnAl_{0.1}B_{0.3}P_{0.4}Cs_{0.2}O_{2.7}$,
$SnAl_{0.1}B_{0.5}P_{0.5}Mg_{0.1}F_{0.2}O_{3.15}$,
$SnAl_{0.1}B_{0.5}P_{0.5}Ba_{0.08}F_{0.08}O_{3.19}$,
$SnAl_{0.2}B_{0.4}P_{0.4}O_{2.9}$,
$SnAl_{0.3}B_{0.5}P_{0.2}O_{2.7}$,
$SnAl_{0.3}B_{0.7}O_{2.5}$,
$SnB_{0.2}P_{0.6}Ba_{0.08}F_{0.08}O_{2.84}$,
$SnB_{0.4}P_{0.4}Ba_{0.1}F_{0.1}O_{2.65}$,
$SnB_{0.5}P_{0.5}O_3$,
$SnB_{0.5}P_{0.5}Mg_{0.1}O_{3.1}$,
$SnB_{0.5}P_{0.5}Mg_{0.1}F_{0.2}O_3$,
$SnB_{0.5}P_{0.5}Li_{0.1}Mg_{0.1}F_{0.2}O_{3.05}$,
$SnB_{0.5}P_{0.5}K_{0.1}Mg_{0.1}F_{0.2}O_{3.05}$,
$SnB_{0.5}P_{0.5}K_{0.05}Mg_{0.05}F_{0.1}O_{3.03}$,
$SnB_{0.5}P_{0.5}K_{0.05}Mg_{0.1}F_{0.2}O_{3.03}$,
$SnB_{0.5}P_{0.5}Cs_{0.1}Mg_{0.1}F_{0.2}O_{3.05}$,
$SnB_{0.5}P_{0.5}Cs_{0.05}Mg_{0.05}F_{0.1}O_{3.03}$,
$SnB_{0.5}P_{0.5}Mg_{0.1}F_{0.1}O_{3.05}$,
$SnB_{0.5}P_{0.5}Mg_{0.1}F_{0.2}O_3$,
$SnB_{0.5}P_{0.5}Mg_{0.1}F_{0.06}O_{3.07}$,
$SnB_{0.5}P_{0.5}Mg_{0.1}F_{0.14}O_{3.03}$,
$SnPBa_{0.08}O_{3.58}$,
$SnPK_{0.1}O_{3.55}$,
$SnPK_{0.05}Mg_{0.05}O_{3.58}$,
$SnPCs_{0.1}O_{3.55}$,
$SnPBa_{0.08}F_{0.08}O_{3.54}$,
$SnPK_{0.1}Mg_{0.1}F_{0.2}O_{3.55}$,
$SnPK_{0.05}Mg_{0.05}F_{0.1}O_{3.53}$,
$SnPCs_{0.1}Mg_{0.1}F_{0.2}O_{3.55}$,
$SnPCs_{0.05}Mg_{0.05}F_{0.1}O_{3.53}$,
$Sn_{1.1}B_{0.2}P_{0.6}Ba_{0.08}F_{0.08}O_{2.94}$,
$Sn_{1.1}B_{0.2}P_{0.6}Li_{0.1}K_{0.1}Ba_{0.1}F_{0.1}O_{3.05}$,
$Sn_{1.1}B_{0.4}P_{0.4}Ba_{0.08}O_{2.74}$,
$Sn_{1.1}PCs_{0.05}O_{3.63}$,
$Sn_{1.1}PK_{0.05}O_{3.63}$,
$Sn_{1.2}Al_{0.1}B_{0.3}P_{0.4}Cs_{0.2}O_{2.8}$,
$Sn_{1.2}B_{0.2}P_{0.6}Ba_{0.08}O_{3.08}$,
$Sn_{1.2}B_{0.2}P_{0.6}Ba_{0.08}F_{0.08}O_{3.04}$,
$Sn_{1.2}B_{0.2}P_{0.6}Mg_{0.04}Ba_{0.04}O_{3.08}$,
$Sn_{1.2}B_{0.3}P_{0.5}Ba_{0.08}O_{2.98}$,
$Sn_{1.3}Al_{0.1}B_{0.3}P_{0.4}Na_{0.2}O_3$,
$Sn_{1.3}B_{0.4}P_{0.4}Ca_{0.2}O_{3.1}$,
$Sn_{1.3}B_{0.4}P_{0.4}Ba_{0.2}O_{3.1}$,
$Sn_{1.4}PK_{0.2}O_4$,
$Sn_{1.4}Ba_{0.1}PK_{0.2}O_{4.15}$,
$Sn_{1.4}Ba_{0.2}PK_{0.2}O_{4.3}$,
$Sn_{1.4}Ba_{0.2}PK_{0.2}Ba_{0.1}F_{0.2}O_{4.3}$,
$Sn_{1.4}PK_{0.3}O_{4.05}$,
$Sn_{1.5}PK_{0.2}O_{4.1}$,
$Sn_{1.5}PK_{0.1}O_{4.05}$,
$Sn_{1.5}PCs_{0.05}O_{4.03}$,
$Sn_{1.5}PCs_{0.05}Mg_{0.1}F_{0.2}O_{4.03}$,
$Sn_2P_2O_7$,
$SnSi_{0.5}Al_{0.1}B_{0.2}P_{0.1}Ca_{0.4}O_{3.1}$,
$SnSi_{0.4}Al_{0.2}B_{0.4}O_{2.7}$,
$SnSi_{0.5}Al_{0.2}B_{0.1}P_{0.1}Mg_{0.1}O_{2.8}$,
$SnSi_{0.6}Al_{0.2}B_{0.2}O_{2.8}$,
$SnSi_{0.5}Al_{0.3}B_{0.4}P_{0.2}O_{3.55}$,
$SnSi_{0.5}Al_{0.3}B_{0.4}P_{0.5}O_{4.30}$,
$SnSi_{0.6}Al_{0.1}B_{0.1}P_{0.3}O_{3.25}$,
$SnSi_{0.6}Al_{0.1}B_{0.1}P_{0.1}Ba_{0.2}O_{2.95}$,
$SnSi_{0.6}Al_{0.1}B_{0.1}P_{0.1}Ca_{0.2}O_{2.95}$,
$SnSi_{0.6}Al_{0.1}B_{0.2}Mg_{0.2}O_{2.85}$,
$SnSi_{0.6}Al_{0.1}B_{0.3}P_{0.1}O_{3.05}$,
$SnSi_{0.6}Al_{0.2}Mg_{0.2}O_{2.7}$,
$SnSi_{0.6}Al_{0.2}Ca_{0.2}O_{2.7}$,
$SnSi_{0.6}Al_{0.2}P_{0.2}O_3$,
$SnSi_{0.6}B_{0.2}P_{0.2}O_3$, $SnSi_{0.8}Al_{0.2}O_{2.9}$,
$SnSi_{0.8}Al_{0.3}B_{0.2}P_{0.2}O_{3.85}$,
$SnSi_{0.8}B_{0.2}O_{2.9}$,
$SnSi_{0.8}Ba_{0.2}O_{2.8}$,
$SnSi_{0.8}Mg_{0.2}O_{2.8}$,
$SnSi_{0.8}Ca_{0.2}O_{2.8}$,
$SnSi_{0.8}P_{0.2}O_{3.1}$,
$Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$,
$Sn_{0.3}Ge_{0.7}Ba_{0.1}P_{0.9}O_{3.35}$,
$Sn_{0.9}Mn_{0.1}Mg_{0.1}P_{0.9}O_{3.35}$,
$Sn_{0.2}Mn_{0.8}Mg_{0.1}P_{0.9}O_{3.35}$,
$Sn_{0.7}Pb_{0.3}Ca_{0.1}P_{0.9}O_{3.35}$,
$Sn_{0.2}Ge_{0.8}Ba_{0.1}P_{0.9}O_{3.35}$,
$Sn_{1.0}Al_{0.48}B_{0.52}P_{0.52}Cs_{0.10}O_{3.85}$,
$Sn_{1.0}Al_{0.38}B_{0.5}P_{0.5}Mg_{0.09}K_{0.1}Ge_{0.09}O_{3.89}$,
$Sn_{1.0}Al_{0.48}B_{0.52}P_{0.52}Cs_{0.10}Ge_{0.10}O_{4.05}$,
$SnB_{0.5}P_{0.5}O_{3}$,
$SnAl_{0.3}B_{0.5}P_{0.2}O_{2.7}$,
$SnAl_{0.3}B_{0.7}O_{2.5}$,
$SnSi_{0.8}P_{0.2}O_{3.1}$,
$SnSi_{0.8}B_{0.2}O_{2.9}$,
$SnSi_{0.8}Al_{0.2}O_{2.9}$,
$SnSi_{0.6}Al_{0.2}B_{0.2}O_{2.8}$,
$SnSi_{0.6}Al_{0.2}P_{0.2}O_{3}$,
$SnSi_{0.6}B_{0.2}P_{0.2}O_{3}$,
$SnSi_{0.4}Al_{0.2}B_{0.4}O_{2.7}$,
$SnSi_{0.6}Al_{0.1}B_{0.1}P_{0.3}O_{3.25}$,
$SnSi_{0.6}Al_{0.1}B_{0.3}P_{0.1}O_{3.05}$,
$SnSi_{0.5}Al_{0.3}B_{0.4}P_{0.2}O_{3.55}$,
$SnSi_{0.5}Al_{0.3}B_{0.4}P_{0.5}O_{4.30}$,
$SnSi_{0.8}Al_{0.3}B_{0.2}P_{0.2}O_{3.85}$,
$SnAl_{0.1}B_{0.5}P_{0.5}Mg_{0.1}F_{0.2}O_{3.15}$,
$SnSi_{0.8}Mg_{0.2}O_{2.8}$,
$SnSi_{0.6}Al_{0.2}Mg_{0.2}O_{2.7}$,
$SnSi_{0.6}Al_{0.1}B_{0.2}Mg_{0.2}O_{2.85}$,
$SnSi_{0.8}Ca_{0.2}O_{2.8}$,
$SnSi_{0.6}Al_{0.2}Ca_{0.2}O_{2.7}$,
$SnSi_{0.6}Al_{0.1}B_{0.1}P_{0.1}Ca_{0.2}O_{2.95}$,
$SnSi_{0.5}Al_{0.2}B_{0.1}P_{0.1}Mg_{0.1}O_{2.8}$,
$SnSi_{0.5}Al_{0.1}B_{0.2}P_{0.1}Ca_{0.4}O_{3.1}$,
$SnSi_{0.8}Ba_{0.2}O_{2.8}$,
$SnSi_{0.6}Al_{0.1}B_{0.1}P_{0.1}Ba_{0.2}O_{2.95}$,
$Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$,
$Sn_{0.3}Ge_{0.7}Ba_{0.1}P_{0.9}O_{3.35}$,
$Sn_{0.9}Mn_{0.1}Mg_{0.1}P_{0.9}O_{3.35}$,
$Sn_{0.2}Mn_{0.8}Mg_{0.1}P_{0.9}O_{3.35}$,
$Sn_{0.7}Pb_{0.3}Ca_{0.1}P_{0.9}O_{3.35}$,
$Sn_{0.2}Ge_{0.8}Ba_{0.1}P_{0.9}O_{3.35}$,
$Sn_{1.6}B_{0.4}P_{0.4}Ca_{0.2}O_{3.4}$,
$Sn_{1.3}B_{0.4}P_{0.4}Ca_{0.2}O_{3.1}$,
$Sn_{1.6}B_{0.4}P_{0.4}Ba_{0.2}O_{3.4}$,
$Sn_{1.3}B_{0.4}P_{0.4}Ba_{0.2}O_{3.1}$,
$Sn_{1.6}B_{0.4}P_{0.4}Mg_{0.2}O_{3.4}$,
$Sn_{1.6}Al_{0.1}B_{0.3}P_{0.4}Ca_{0.2}O_{3.4}$,
$Sn_{1.3}Al_{0.1}B_{0.3}P_{0.4}K_{0.2}O_{3}$,
$Sn_{1.0}Al_{0.1}B_{0.3}P_{0.4}K_{0.2}O_{2.7}$,
$Sn_{1.6}Al_{0.1}B_{0.3}P_{0.4}Na_{0.2}O_{3.3}$,
$Sn_{1.3}Al_{0.1}B_{0.3}P_{0.4}Na_{0.2}O_{3}$,
$Sn_{1.0}Al_{0.1}B_{0.3}P_{0.4}Na_{0.2}O_{2.7}$,
$Sn_{1.6}Al_{0.1}B_{0.3}P_{0.4}Rb_{0.2}O_{3.3}$,
$Sn_{1.3}Al_{0.1}B_{0.3}P_{0.4}Rb_{0.2}O_{3}$,
$Sn_{1.0}Al_{0.1}B_{0.3}P_{0.4}Rb_{0.2}O_{2.7}$,
$Sn_{1.6}Al_{0.1}B_{0.3}P_{0.4}Cs_{0.2}O_{3.3}$, $Sn_{1.2}Al_{0.1}B_{0.3}P_{0.4}Cs_{0.2}O_{2.9}$,
$Sn_{1.0}Al_{0.1}B_{0.3}P_{0.4}Cs_{0.2}O_{2.7}$,
$Sn_{1.3}Al_{0.1}B_{0.3}P_{0.4}Ba_{0.1}K_{0.1}O_{3.05}$,
$SnAl_{0.4}B_{0.5}P_{0.5}K_{0.1}O_{3.65}$,
$SnAl_{0.4}B_{0.5}P_{0.5}Na_{0.2}O_{3.7}$,
$SnAl_{0.4}B_{0.3}P_{0.5}Rb_{0.2}O_{3.4}$,
$SnAl_{0.4}B_{0.5}P_{0.5}Cs_{0.1}O_{3.65}$,
$SnAl_{0.4}B_{0.5}P_{0.5}K_{0.1}Ge_{0.05}O_{3.65}$,
$SnAl_{0.4}B_{0.5}P_{0.5}K_{0.1}Mg_{0.1}Ge_{0.02}O_{3.83}$,
$SnAl_{0.4}B_{0.4}P_{0.4}P_{3.2}$,
$SnAl_{0.3}B_{0.5}P_{0.2}O_{2.7}$,
$SnAl_{0.3}B_{0.5}P_{0.2}O_{2.7}$,
$SnAl_{0.4}B_{0.5}P_{0.3}Ba_{0.08}Mg_{0.08}O_{3.26}$,
$SnAl_{0.4}B_{0.4}P_{0.4}Ba_{0.08}O_{3.28}$,
$SnAl_{0.4}B_{0.5}P_{0.5}O_{3.6}$,
$SnAl_{0.4}B_{0.5}P_{0.5}Mg_{0.1}O_{3.7}$,
$SnAl_{0.5}B_{0.4}P_{0.5}Mg_{0.1}F_{0.2}O_{3.65}$,
$SnB_{0.5}P_{0.5}Li_{0.1}Mg_{0.1}F_{0.2}O_{3.05}$,
$SnB_{0.5}P_{0.5}K_{0.1}Mg_{0.1}F_{0.2}O_{3.05}$,
$SnB_{0.5}P_{0.5}K_{0.05}Mg_{0.05}F_{0.1}O_{3.03}$,
$SnB_{0.5}P_{0.5}K_{0.05}Mg_{0.1}F_{0.2}O_{3.03}$,
$SnAl_{0.4}B_{0.5}P_{0.5}Cs_{0.1}Mg_{0.1}F_{0.2}O_{3.65}$,
$SnB_{0.5}P_{0.5}Cs_{0.05}Mg_{0.05}F_{0.1}O_{3.03}$,
$SnB_{0.5}P_{0.5}Mg_{0.1}P_{0.1}O_{3.05}$,
$SnB_{0.5}P_{0.5}Mg_{0.1}F_{0.2}O_{3}$,
$SnB_{0.5}P_{0.5}Mg_{0.1}F_{0.06}O_{3.07}$,
$SnB_{0.5}P_{0.5}Mg_{0.1}F_{0.14}O_{3.03}$,
$SnPBa_{0.06}O_{3.58}$,
$SnPK_{0.1}O_{3.55}$,
$SnPK_{0.05}Mg_{0.05}O_{3.58}$,
$SnPCs_{0.1}O_{3.55}$,
$SnPBa_{0.06}F_{0.03}O_{3.54}$,
$SnPK_{0.1}Mg_{0.1}F_{0.2}O_{3.55}$,
$SnPK_{0.05}Mg_{0.05}F_{0.1}O_{3.53}$,
$SnPCs_{0.1}Mg_{0.1}F_{0.2}O_{3.55}$,
$SnPCs_{0.05}Mg_{0.05}F_{0.1}O_{3.53}$,
$Sn_{1.1}Al_{0.4}B_{0.2}P_{0.6}Ba_{0.08}F_{0.08}O_{3.54}$,
$Sn_{1.1}Al_{0.4}B_{0.2}P_{0.6}Li_{0.1}K_{0.1}Ba_{0.1}F_{0.1}O_{3.65}$,
$Sn_{1.1}Al_{0.4}B_{0.4}P_{0.4}Ba_{0.08}O_{3.34}$,
$Sn_{1.1}Al_{0.4}PCs_{0.05}O_{4.23}$,
$Sn_{1.1}Al_{0.4}PK_{0.05}O_{4.23}$,
$Sn_{1.2}Al_{0.5}B_{0.3}P_{0.4}Cs_{0.2}O_{3.5}$,
$Sn_{1.2}Al_{0.4}B_{0.2}P_{0.5}Ba_{0.08}O_{3.68}$,
$Sn_{1.2}Al_{0.4}B_{0.2}P_{0.5}Ba_{0.08}F_{0.08}O_{3.54}$,
$Sn_{1.2}Al_{0.4}B_{0.2}P_{0.6}Mg_{0.04}Ba_{0.04}O_{3.68}$,
$Sn_{1.2}Al_{0.4}B_{0.3}P_{0.5}Ba_{0.08}O_{3.58}$,
$Sn_{1.3}Al_{0.3}B_{0.3}P_{0.4}Na_{0.2}O_{3.3}$,
$Sn_{1.3}Al_{0.2}B_{0.4}P_{0.4}Ca_{0.2}O_{3.4}$,
$Sn_{1.3}Al_{0.4}B_{0.4}P_{0.4}Ba_{0.2}O_{3.6}$,
$Sn_{1.4}Al_{0.4}PK_{0.2}O_{4.6}$,
$Sn_{1.4}Al_{0.2}Ba_{0.1}PK_{0.2}O_{4.45}$,
$Sn_{1.4}Al_{0.2}Ba_{0.2}PK_{0.2}O_{4.6}$,
$Sn_{1.4}Al_{0.4}Ba_{0.2}PK_{0.2}Ba_{0.1}F_{0.2}O_{4.9}$,
$Sn_{1.4}Al_{0.4}PK_{0.3}O_{4.65}$,
$Sn_{1.5}Al_{0.2}PK_{0.2}O_{4.4}$,
$Sn_{1.5}Al_{0.4}PK_{0.1}O_{4.65}$,
$Sn_{1.5}Al_{0.4}PCs_{0.05}O_{4.63}$,
$Sn_{1.5}Al_{0.4}PCs_{0.05}Mg_{0.1}F_{0.2}O_{4.63}$,
$SnSi_{0.5}Al_{0.1}B_{0.2}P_{0.1}Ca_{0.4}O_{3.1}$,
$SnSi_{0.4}Al_{0.2}B_{0.4}O_{2.7}$,
$SnSi_{0.5}Al_{0.2}B_{0.1}P_{0.1}Mg_{0.1}O_{2.8}$,
$SnSi_{0.6}Al_{0.2}B_{0.2}O_{2.8}$,
$SnSi_{0.5}Al_{0.3}B_{0.4}OP_{0.2}O_{3.55}$,
$SnSi_{0.5}Al_{0.3}B_{0.4}P_{0.5}O_{4.30}$,
$SnSi_{0.6}Al_{0.1}B_{0.1}OP_{0.3}O_{3.25}$,
$SnSi_{0.6}Al_{0.1}B_{0.1}P_{0.1}Ba_{0.2}O_{2.95}$,
$SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$,
$SnSi_{0.6}Al_{0.1}B_{0.3}P_{0.1}O_{3.05}$,
$SnSi_{0.6}Al_{0.2}Mg_{0.2}O_{2.7}$,
$SnSi_{0.6}Al_{0.2}Ca_{0.2}O_{2.7}$,
$SnSi_{0.6}Al_{0.2}P_{0.2}O_3$,
$SnSi_{0.6}B_{0.2}P_{0.2}O_3$,
$SnSi_{0.8}Al_{0.2}O_{2.9}$,
$SnSi_{0.8}Al_{0.3}B_{0.2}P_{0.2}O_{3.85}$,
$SnSi_{0.8}B_{0.2}O_{2.9}$,
$SnSi_{0.8}Ba_{0.2}O_{2.8}$,
$SnSi_{0.8}Mg_{0.2}O_{2.8}$,
$SnSi_{0.8}Ca_{0.2}O_{2.8}$,
$SnSi_{0.8}P_{0.2}O_{3.1}$,
$Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$,
$Sn_{0.3}Ge_{0.7}Ba_{0.1}P_{0.9}O_{3.35}$,
$Sn_{0.9}Mn_{0.1}Mg_{0.1}P_{0.9}O_{3.35}$,
$Sn_{0.2}Mn_{0.8}Mg_{0.1}P_{0.9}O_{3.35}$,
$Sn_{0.7}Pb_{0.3}Ca_{0.1}P_{0.9}O_{3.35}$,
$Sn_{0.2}Ge_{0.8}Ba_{0.1}P_{0.9}O_{3.35}$,
$SnGe_{0.001}P_{0.1}B_{0.1}K_{0.5}O_{1.65}$,
$SnGe_{0.02}P_{0.3}K_{0.1}O_{1.84}$,
$SnGe_{0.02}P_{0.15}B_{0.15}K_{0.1}O_{1.69}$,
$SnGe_{0.05}P_{0.3}B_{0.4}K_{0.1}O_{2.5}$,
$SnGe_{0.05}P_{0.8}K_{0.1}O_{3.15}$,
$SnGe_{0.05}P_{0.6}B_{0.3}Mg_{0.1}K_{0.1}O_{3.8}$,
$SnGe_{0.05}P_{0.5}B_{0.5}Cs_{0.05}K_{0.05}O_{3.15}$,
$SnGe_{0.1}P_{0.9}K_{0.1}O_{3.5}$,
$SnGe_{0.1}P_{0.7}B_{0.2}K_{0.1}Mg_{0.1}O_{3.3}$,
$SnGe_{0.1}P_{0.5}B_{0.5}Ba_{0.05}K_{0.1}O_{2.3}$,
$SnGe_{0.1}P_{0.5}B_{0.5}Pb_{0.05}K_{0.1}O_{2.3}$,
$SnGe_{0.1}P_{0.5}B_{0.5}Mg_{0.05}K_{0.15}O_{3.325}$,
$SnGe_{0.1}P_{0.5}B_{0.5}Mg_{0.2}K_{0.05}O_{3.425}$,
$SnGe_{0.1}P_{0.5}B_{0.5}Mg_{0.01}O_{3.201}$,
$SnGe_{0.1}P_{0.5}B_{0.5}Al_{0.05}Mg_{0.1}K_{0.1}O_{3.425}$,
$SnGe_{0.1}P_{0.5}B_{0.5}Mg_{0.1}Li_{0.1}O_{3.25}$,
$SnGe_{0.1}P_{0.5}B_{0.5}Na_{0.1}O_{3.205}$,
$SnGe_{0.1}P_{0.5}B_{0.5}K_{0.1}Ca_{0.05}O_{3.275}$,
$SnGe_{0.1}P_{0.5}B_{0.5}Mg_{0.1}K_{0.1}F_{0.1}O_{3.25}$,
$SnGe_{0.1}P_{0.5}B_{0.5}K_{0.1}Sc_{0.02}O_{3.28}$,
$SnGe_{0.1}P_{0.5}B_{0.5}Mg_{0.1}K_{0.1}Y_{0.01}O_{3.365}$,
$SnGe_{0.1}P_{0.5}B_{0.5}Al_{0.1}K_{0.1}O_{3.4}$,
$SnGe_{0.1}P_{0.5}B_{0.5}Cs_{0.1}O_{3.25}$,
$SnGe_{0.1}P_{0.5}B_{0.5}Rb_{0.1}O_{3.25}$,
$SnGe_{0.1}P_{0.5}B_{0.5}Mg_{0.1}K_{0.1}Al_{0.05}O_{3.425}$,
$SnGe_{0.1}P_{0.35}B_{0.35}Mg_{0.2}K_{0.1}O_{2.85}$,
$SnGe_{0.1}P_{0.45}B_{0.45}Mg_{0.1}K_{0.1}O_{3.05}$,
$SnGe_{0.2}P_{0.45}B_{0.45}Mg_{0.1}K_{0.1}O_{3.35}$,
$SnGe_{0.01}P_{0.45}B_{0.45}Mg_{0.1}K_{0.1}O_{2.97}$,
$SnGe_{0.001}P_{0.45}B_{0.45}Mg_{0.1}K_{0.1}O_{2.952}$,
$SnGe_{0.02}P_{0.45}B_{0.45}Mg_{0.1}K_{0.1}O_{3.09}$,
$SnGe_{0.1}P_{1.0}Mg_{0.2}K_{0.1}O_{3.95}$,
$SnGe_{0.5}P_{0.7}B_{0.8}K_{0.2}Mg_{0.2}O_{5.25}$,
$SnGe_{0.8}P_{0.9}B_{0.9}K_{0.1}Mg_{0.1}O_{6.25}$,
$SnGe_{1.0}P_{1.0}B_{1.0}Cs_{0.1}O_{7.05}$,
$SnGe_{1.3}P_{1.0}B_{1.0}K_{0.2}O_{8.7}$,
$SnGe_{0.1}P_{0.4}B_{0.6}Cs_{0.1}O_{3.05}$,
$SnGe_{0.1}P_{0.5}B_{0.5}Cs_{0.05}K_{0.05}O_{3.25}$,
$SnGe_{0.2}P_{0.7}B_{0.2}K_{0.1}Mg_{0.1}O_{3.5}$,
$SnGe_{0.2}P_{1.1}K_{0.1}O_{4.2}$,
$SnGe_{0.2}P_{0.7}B_{0.4}K_{0.1}Mg_{0.1}O_{3.9}$,
$SnGe_{0.5}P_{0.7}B_{0.8}K_{0.2}Mg_{0.2}O_{5.25}$,
$SnGe_{0.6}P_{0.8}B_{0.8}Cs_{0.1}O_{5.45}$,
$SnGe_{0.7}P_{1.8}K_{0.2}O_7$,
$SnGe_{0.8}P_{0.9}B_{0.9}K_{0.2}Mg_{0.4}O_{6.7}$,
$SnGe_1P_{0.4}As_{0.1}B_{0.1}K_{0.1}Mg_{0.1}O_{4.45}$,
$SnGe_{0.1}O_{1.2}$,
$SnGe_{0.3}O_{1.6}$,
$SnGe_{0.5}O_{2.0}$,
$SnGe_{0.8}O_{2.6}$,
$SnGeO_3$,
$SnGe_{1.3}O_{3.6}$,
$SnGe_{0.001}SiP_{0.1}K_{0.5}O_{3.65}$,
$SnGe_{0.02}Si_{0.3}K_{0.7}P_{0.3}O_{3.24}$,
$SnGe_{0.05}Si_{0.3}P_{0.3}B_{0.4}K_{0.1}O_{3.1}$,
$SnGe_{0.05}Si_{0.1}P_{0.6}B_{0.3}Mg_{0.1}K_{0.1}O_{4.0}$,
$SnGe_{0.05}Si_{0.1}P_{0.5}B_{0.5}Cs_{0.05}K_{0.05}O_{3.35}$,
$SnGe_{0.1}Si_{0.3}P_{0.9}K_{0.1}O_{4.1}$,
$SnGe_{0.1}Si_{0.1}P_{0.5}B_{0.5}Mg_{0.1}K_{0.1}O_{3.55}$,
$SnGe_{0.1}Si_{0.3}P_{0.5}B_{0.5}Al_{0.1}K_{0.1}O_{3.0}$,
$SnGe_{0.1}Si_{0.05}P_{0.5}P_{0.5}Pb_{0.05}K_{0.1}O_{2.4}$,
$SnGe_{0.1}Si_{0.1}P_{0.5}B_{0.5}Mg_{0.05}K_{0.15}O_{3.525}$,
$SnGe_{0.1}Si_{0.3}P_{0.5}B_{0.5}Mg_{0.2}K_{0.05}O_{4.025}$,
$SnGe_{0.1}Si_{0.1}P_{0.5}B_{0.5}Mg_{0.01}O_{3.401}$,
$SnGe_{0.1}Si_{0.05}P_{0.5}B_{0.5}Al_{0.05}Mg_{0.1}K_{0.1}O_{3.425}$,
$SnGe_{0.1}Si_{0.1}P_{0.5}B_{0.5}Cs_{0.1}O_{3.405}$,
$SnGe_{0.1}Si_{0.5}P_{0.5}B_{0.5}Mg_{0.1}Li_{0.1}O_{4.35}$,
$SnGe_{0.1}Si_{0.3}P_{0.5}B_{0.5}Na_{0.1}O_{3.805}$,
$SnGe_{0.1}Si_{0.1}P_{0.5}B_{0.5}Rb_{0.1}O_{3.405}$,
$SnGe_{0.1}Si_{0.2}P_{0.5}B_{0.5}K_{0.1}Ca_{0.05}O_{3.675}$,
$SnGe_{0.1}Si_{0.01}P_{0.5}B_{0.5}Mg_{0.1}K_{0.1}F_{0.1}O_{3.27}$,
$SnGe_{0.1}Si_{0.02}P_{0.5}B_{0.5}K_{0.1}Sc_{0.02}O_{3.32}$,
$SnGe_{0.1}Si_{0.2}P_{0.5}B_{0.5}Mg_{0.1}K_{0.1}Y_{0.01}O_{3.765}$,
$SnGe_{0.1}Si_{0.5}P_{0.2}B_{0.3}Al_{0.1}O_{3.3}$,
$SnGe_{0.1}Si_{0.5}B_{0.2}Mg_{0.1}Al_{0.1}O_{2.75}$,
$SnGe_{0.1}Si_{0.1}B_{0.5}Al_{0.1}K_{0.1}O_{3.6}$,
$SnGe_{0.1}Si_{0.2}P_{0.5}B_{0.5}Ba_{0.05}K_{0.1}O_{3.3}$,
$SnGe_{0.1}Si_{0.05}P_{0.5}B_{0.5}Cs_{0.1}O_{3.26}$,
$SnGe_{0.1}Si_{0.2}P_{0.5}B_{0.5}Mg_{0.01}O_{3.25}$,
$SnGe_{0.2}Si_{0.3}P_{0.1}B_{0.1}Mg_{0.5}K_{0.5}O_{3.15}$,
$SnGe_{0.1}Si_{0.7}P_{0.1}B_{0.1}K_{0.5}O_{3.25}$,
$SnGe_{0.1}Si_{0.4}P_{0.35}B_{0.35}Mg_{0.2}K_{0.1}O_{3.65}$,
$SnGe_{0.2}Si_{0.3}P_{0.45}B_{0.45}Mg_{0.1}K_{0.1}O_{3.95}$,
$SnGe_{0.001}Si_{0.2}P_{0.45}B_{0.45}Mg_{0.1}K_{0.1}O_{2.77}$,
$SnGe_{0.001}Si_{0.3}P_{0.45}B_{0.45}Mg_{0.1}K_{0.1}O_{3.552}$,
$SnGe_{0.1}Si_{0.5}P_{1.0}Mg_{0.2}K_{0.1}O_{4.95}$,
$SnGe_{0.1}Si_{0.01}P_{0.6}B_{0.6}K_{0.1}Mg_{0.01}O_{3.68}$,
$SnGe_{0.5}Si_{0.2}P_{0.7}B_{0.8}K_{0.2}Mg_{0.2}O_{5.65}$,
$SnGe_{1.0}Si_{0.001}P_{1.0}B_{1.0}Cs_{0.1}O_{7.052}$,
$SnGe_{0.1}Si_{0.1}P_{0.4}B_{0.6}Cs_{0.1}O_{3.25}$,
$SnGe_{0.1}Si_{0.2}P_{0.5}B_{0.5}Cs_{0.05}K_{0.05}O_{3.65}$,
$SnGe_{0.2}Si_{0.3}P_{0.7}B_{0.2}K_{0.1}Mg_{0.1}O_{4.1}$,
$SnGe_{0.2}Si_{0.1}P_{0.5}B_{0.5}Mg_{0.1}K_{0.1}O_{3.75}$,
$SnGe_{0.2}Si_{0.5}P_{1.1}K_{0.1}O_{5.2}$,
$SnGe_{0.5}Si_{0.3}P_{0.7}B_{0.8}K_{0.2}Mg_{0.2}O_{5.85}$,
$SnGe_1Si_{1.2}P_{0.4}As_{0.1}B_{0.1}K_{0.1}Mg_{0.1}O_{6.85}$,
$SnGe_{0.1}Si_{1.7}O_{4.6}$,
$SnGe_{0.3}Si_{2.0}O_{5.8}$,
$SnGe_{0.5}Si_{1.5}O_5$,
$SnGe_{0.8}Si_{1.2}O_{4.0}$,
$SnGeSi_2O_7$,
$SnGe_{1.3}Si_{1.8}O_{7.2}$,
$SnGeSiO_5$,

The chemical formula of the compound as obtained by calcining can be determined through inductively coupled plasma (ICP) emission spectroscopic analysis or, more conveniently, by calculation making use of the difference in powder weight between before and after the calcining.

A light metal is intercalated into the negative electrode material until the potential approximates to the precipitating potential of that light metal. For example, the amount introduced is preferably 50 to 700 mol %, particularly preferably 100 to 600 mol %, based on the negative electrode material. The amount released is preferably as much as possible with reference to the amount introduced. Intercalation of a light metal is preferably performed by an electrochemical process, a chemical process or a thermal process. The electrochemical process is preferably carried out by electrochemically introducing the light metal present in a positive electrode active material or directly introducing a light metal ion from a light metal or an alloy thereof. The chemical process can be carried out by mixing or bringing into contact with a light metal or reacting with an organometallic compound, e.g., butyl lithium. The electrochemical process and the chemical process are preferred. Lithium or a lithium ion is a particularly preferred light metal to be used.

The negative electrode material of the invention may contain various elements as a dopant, such as a lanthanide metal (e.g., Hf, Ta, W, Re, Os, Ir, Pt. Au, and Hg) or a compound affording improved electron conductivity (e.g., an Sb, In or Nb compound). The amount of the compound to be added is preferably 0 to 5 mol %.

The surface of the oxide as a positive electrode active material or a negative electrode material can be coated with an oxide having a different chemical formula from the positive electrode active material or the negative electrode material. The oxide for covering the positive electrode active material or negative electrode material is preferably one containing a compound soluble in both an acidic solution and an alkaline solution. A metal oxide having high electron conductivity is more preferred. Such preferred examples of the metal oxides include $PbO_2$, $Fe_2O_3$, $SnO_2$, $In_2O_3$, and ZnO, and these oxides having incorporated therein a dopant (e.g., a metal of different valence as an oxide, a halogen atom, etc.). Particularly preferred of them are $SiO_2$, $SnO_2$, $Fe_2O_3$, ZnO, and $PbO_2$. The amount of the metal oxide used for the surface treatment is preferably 0.1 to 10% by weight, more preferably 0.2 to 5% by weight, particularly preferably 0.3 to 3% by weight, based on the positive electrode active material or the negative electrode material.

The surface of the positive electrode active material or the negative electrode material may be modified. For example, the surface of the metal oxide is treated with an esterifying agent, a chelating agent, a conductive polymer, polyethylene oxide, and the like.

The positive electrode active material which can be used in the invention may be a transition metal oxide capable of reversibly intercalating and deintercalating lithium ions but is preferably a lithium-containing transition metal oxide. Lithium-containing transition metal oxides that are preferred for use as a positive electrode active material in the invention include lithium-containing oxides containing Ti, V, Cr, Mn, Fe, Co, Ni, Cu, Mo or W. The oxide may contain an alkali metal other than lithium (the group IA and IIA elements of the Periodic Table) and/or Al, Ga, In, Ge, Sn, Pb, Sb, Bi, Si, P, B, etc. The ratio of these additional elements is preferably 0 to 30 mol % based on the transition metal.

Preferred of the Li-containing transition metal oxides as a positive electrode active material are those prepared from a mixture of a lithium compound and a transition metal compound (the "transition metal" is at least one element selected from the group consisting of Ti, V, Cr, Mn, Fe, Co, Ni, Mo, and W) at a molar ratio of lithium compound to total transition metal compounds of 0.3 to 2.2.

More preferred of the Li-containing transition metal oxides as a positive electrode active material are those prepared from a mixture of a lithium compound and a transition metal compound (the "transition metal" is at least one element selected from the group consisting of V, Cr, Mn, Fe, Co, and Ni) at a molar ratio of lithium compound to total transition metal compounds of 0.3 to 2.2.

Particularly preferred are those represented by formula $Li_xQO_y$ (wherein Q consists mainly of a transition metal(s) containing at least one selected from the group consisting of Co, Mn, Ni, V, and Fe; x=0.2 to 1.2; y=1.4 to 3). Q may contain Al, Ga, In, Ge, Sn, Pb, Sb, Bi, Si, P, B, etc. in addition to the transition metal(s) in a proportion of 0 to 30 mol % based on the transition metal(s).

Examples of the preferred lithium-containing metal oxide positive electrode active materials for use in the present invention include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xCo_bB_{1-b}O_2$, $Li_xCo_bSi_{1-b}O_2$, a mixture of $Li_xMn_2O_4$ and $MnO_2$, a mixture of $Li_{2x}MnO_3$ and $MnO_2$, a mixture of $Li_xMn_2O_4$, $Li_{2x}MnO_3$, and $MnO_2$ (wherein x=0.2 to 1.2; a=0.1 to 0.9; b=0.8 to 0.98; c=1.6 to 1.96; and z=2.01 to 5).

Examples of more preferred lithium-containing metal oxide positive electrode active materials for use in the invention include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xFe_{2-c}O_4$ (wherein x=0.7 to 1.2; a=0.1 to 0.9; b=0.8 to 0.98; c=1.6 to 1.96; and z=2.01 to 2.3).

Examples of particularly preferred lithium-containing metal oxide positive electrode active materials for use in the invention include $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$, and (wherein x=0.7 to 1.2; a=0.1 to 0.9; b=0.9 to 0.98; z=2.02 to 2.3).

The value x in the above formulae is the one before commencement of charging and discharging and is subject to variation with a charge and a discharge.

The positive electrode active material can be synthesized by mixing a lithium compound and a transition metal compound(s), followed by calcining method or by solution reaction. The calcining process is particularly preferred. The calcining temperature is selected from the range in which a part of the mixed compounds may decompose or melt, for example, from 250° to 2000° C., preferably from 350° to 1500° C. Calcining is preferably preceded by calcination at 250 to 900° C. The calcining time is preferably 1 to 72 hours, more preferably 2 to 20 hours. The mixing of the raw materials may be either dry blending or wet blending. The calcining may be followed by annealing at 200 to 900° C.

The calcining gas atmosphere is not particularly limited and may be either an oxidative atmosphere or a reducing atmosphere. For example, air, a gas having an arbitrarily controlled oxygen concentration, hydrogen, carbon monoxide, nitrogen, argon, helium, krypton, xenon, carbon dioxide, etc. can be used.

In the synthesis of the positive electrode active material for use in the invention, chemical intercalation of lithium into a transition metal oxide is preferably achieved by reacting a transition metal oxide with metallic lithium, a lithium alloy or butyl lithium.

While not limiting, the positive electrode active material preferably has an average particle size of 0.1 to 50 μm and a specific surface area of 0.01 to 50 $m^2/g$, measured by a BET method. The supernatant liquid of a solution of 5 g of a positive electrode active material in 100 ml of distilled water preferably has a pH of 7 to 12.

The synthesized positive electrode active material is ground to a prescribed size by means of well-known grinding machines or classifiers, such as a mortar, a ball mill, a vibration ball mill, a satellite ball mill, a planetary ball mill, spinning air flow type jet mill, and a sieve.

The positive electrode active material obtained by calcining may be washed with water, an acid aqueous solution, an alkali aqueous solution, an organic solvent, etc. before use.

A preferred combination of a negative electrode material and a positive electrode active material for use in the invention consists of a compound represented by formula (1) and $Li_xCoO_2$, $Li_xNiO_2$, $Li_xCo_aNi_{1-a}O_2$, $Li_xMnO_2$, $Li_xMn_2O_4$ or $Li_xCo_bV_{1-b}O_z$ (wherein x=0.7 to 1.2; a=0.1 to 0.9; b=0.9 to 0.98; z=2.02 to 2.3). From this combination is obtained a nonaqueous secondary battery having a high discharge potential, a high capacity, and excellent charge and discharge cyclic characteristics.

The amount of lithium to be intercalated into the negative electrode material is 3 to 10 equivalents, and the ratio of a negative electrode material to a positive electrode active material is decided in conformity with this equivalent amount. The decided ratio as calculated from the equivalent amount is multiplied by a coefficient of 0.5 to 2. Where a substance other than a positive electrode active material, e.g., metallic lithium, a lithium alloy or butyl lithium, is used as a lithium source, the amount of a positive electrode active material to be used is decided in conformity with the equivalent amount of lithium released from the negative electrode material. In this case, too, the ratio of the amount to be used calculated based on the equivalent amount is preferably multiplied by a coefficient of 0.5 to 2.

Where lithium is previously introduced into a negative electrode from a lithium source other than a positive electrode active material, lithium sources preferably include a foil or powder of metallic lithium or a lithium alloy (e.g., an alloy with Al, Al—Mn, Al—Mg, Al—Sn, Al—In or Al—Cd). The metallic foil, etc. is provided on the negative electrode either directly or via a protective layer of the invention. It can also be provided on a current collector having no negative electrode material mixture. In using a foil, a thin foil (e.g., having a thickness of about 20 µm) can be put over the uniformly entire area, or a thicker one can be partially applied in places. The thickness of the foil is decided from the amount of lithium that is to be introduced into the negative electrode spontaneously after assembly into a battery.

An electrode material mixture can contain an electron conductive agent, a binder, a filler. Any electron conductive agent that undergoes no chemical change in an assembled battery can be used. Commonly used conducting agents include natural graphite (flaky graphite, scale graphite, earthy graphite, etc.), artificial graphite, carbon black (e.g., acetylene black or Ketjen black), carbon fiber, metal powder (e.g., copper, nickel, aluminum or silver), metallic fiber or polyphenylene derivatives, and mixtures of two or more thereof. A combination of graphite and acetylene black is particularly preferred. The graphite/acetylene black combination is preferably used in an amount of 1 to 50% by weight, particularly 2 to 30% by weight. In particular, carbon or graphite is preferably used in an amount of 2 to 15% by weight.

Examples of generally used binders include polysaccharides, thermoplastic resins, and polymers having rubbery elasticity, such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymers (EPDM), sulfonated EPDM, styrene-butadiene rubber, polybutadiene, fluorine rubbers, polyethylene oxide, and mixtures of two or more thereof. In using a compound having a functional group reactive with lithium, such as a polysaccharide, it is preferable to deactivate the functional group by addition of such a compound as has an isocyanate group. The binder is preferably used in an amount of 1 to 50% by weight, particularly 2 to 30% by weight.

As a filler, any fibrous material that does not undergo chemical change in an assembled battery can be used. Fibers of polyolefins (e.g., polypropylene or polyethylene), glass or carbon are usually used. While not limiting, the filler is preferably used in an amount of from 0 to 30% by weight.

In using the negative electrode material according to the invention in a nonaqueous secondary battery, it is preferable that a water-dispersion paste of an electrode material mixture containing the compound of the invention is applied to a current collector and dried and that the water-dispersion paste has a pH of 5 or more and less than 10, particularly 6 or more and less than 9. It is also preferable that the water-dispersion paste be kept at a temperature at 5° C. or more and lower than 8° C. and that the paste be applied to a current collector within 7 days from the preparation.

The separator to be used is made of an insulating material having fine pores or interstices and exhibiting high ion permeability and prescribed mechanical strength. For improvement of safety, the material should close its pores or interstices at 80° C. or higher to increase the resistivity thereby to break the electric current. The temperature at which the interstices are closed is preferably 90 to 180° C., more preferably 110 to 170° C.

Any well-known method of providing interstices can be used depending on the material. In the case of a porous film, the pores usually have a circular or elliptical shape and a size of 0.05 to 30 µm, preferably 0.1 to 20 µm. The pores may be rod-like or irregular in shape as are formed by stretching or phase separation. In the case of fabric, the interstices are formed among fibers, their shape and size depending on the method of manufacturing woven fabric or nonwoven fabric. The ratio of the interstices, namely a porosity, is 20 to 90%, preferably 35 to 80%.

The separator for use in the invention is a finely porous film, woven fabric or nonwoven fabric having a thickness of 5 to 100 µm, preferably 10 to 80 µm.

The separator for use in the invention preferably contains at least 20% by weight, particularly 30% by weight or more, of an ethylene component. Examples of components other than ethylene include propylene, butene, hexene, ethylene fluoride, vinyl chloride, vinyl acetate, and vinyl alcohol acetal, with propylene and ethylene fluoride being particularly preferred.

The finely porous film preferably comprises polyethylene, an ethylene-propylene copolymer, or an ethylene-butene copolymer. One prepared from a mixed solution of polyethylene and polypropylene or a mixed solution of polyethylene and polytetrafluoroethylene is also preferred.

The woven or nonwoven fabric is preferably made of fibers having a fiber diameter of 0.1 to 5 µm and comprising polyethylene, an ethylene-propylene copolymer, an ethylene-butene-1 copolymer, an ethylene-methylbutene copolymer, an ethylene-methylpentene copolymer, polypropylene or polytetrafluoroethylene.

The separator may be made up of either a single material or a combination of different materials. A laminate of two or more finely porous films different in pore size, porosity or temperature for pore closing, a composite material of a finely porous film and nonwoven fabric or woven fabric, and a composite material of nonwoven fabric and paper are particularly preferred.

The separator may contain inorganic fiber, such as glass fiber or carbon fiber, or particles of inorganic substances, such as silicon dioxide, zeolite, alumina, and talc. The interstices or surfaces of the separator can be made hydrophilic by treatment with a surface active agent.

The electrolyte used in the invention consists of at least one aprotic organic solvent and at least one lithium salt soluble in the solvent. Examples of the organic solvents include propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric acid triesters, trimethoxymethane, dioxolane derivatives, sulfolane, 3-methyl-2-oxazolidinone, propylene carbonate derivatives, tetrahydrofuran derivatives, diethyl ether, and 1,3-propanesultone. Examples of the lithium salts soluble in these solvents include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lower fatty acid salts of lithium, $LiAlCl_4$, LiCl, LiBr, LiI, chloroboran lithium, and lithium tetraphenylborate. An electrolyte comprising a mixed solvent of propylene carbonate or ethylene carbonate and 1,2-dimethoxyethane and/or diethyl carbonate having dissolved therein $LiCF_3SO_3$, $LiClO_4$, $LiBF_4$ and/or $LiPF_6$ is preferred. An electrolyte comprising a mixed solvent of ethylene carbonate and diethyl carbonate having dissolved therein $LiBF_4$ and/or $LiPF_6$ is particularly preferred.

The amount of the electrolyte to be used in a battery is not particularly limited and can be selected according to the amounts of the positive electrode active material and the negative electrode material and the size of the battery. The concentration of the lithium salt as a supporting electrolyte is preferably 0.2 to 3 mol per liter of an electrolytic solution.

In addition, the following solid electrolytes may also be employed. Solid electrolytes are divided into inorganic solid electrolytes and organic solid electrolytes. Examples of well-known inorganic solid electrolytes include lithium nitride, a lithium halide, and a lithium oxyacid salt. Among them, $Li_3N$, LiI, $Li_5NI_2$, $Li_3N$—LiI—LiOH, $LiSiO_4$, $LiSiO_4$—LiI—LiOH, $xLi_3PO_4$-$(1-x)Li_4SiO_4$, $Li_2SiS_3$, and phosphorus sulfide compounds are effective.

Examples of effective organic solid electrolytes include polyethylene oxide derivatives or polymers containing the same, polypropylene oxide derivatives or polymers containing the same, polymers containing an ionizing group, a mixture of a polymer containing an ionizing group and the above-mentioned aprotic electrolyte, and phosphoric ester polymers.

A method of adding polyacrylonitrile to an electrolytic solution and a method of combining an organic solid electrolyte and an inorganic solid electrolyte are also known.

The separator to be used is an electrically insulating thin film having high ion permeability and prescribed mechanical strength. A sheet or nonwoven fabric made of an olefin polymer (e.g., polypropylene or polyethylene) or glass fiber is used far its resistance to organic solvents and hydrophobic properties. The pore size of the separator is selected from a range commonly employed for batteries, for example a range of from 0.01 to 10 μm. The separator has a thickness selected from a range commonly employed for batteries, for example a range of from 5 to 300 μm.

It is known that the following compounds can be added to the electrolyte for the purpose of improving discharge performance and charge and discharge cycle characteristics. Examples of the compounds include pyridine, triethyl phosphite, triethanolamine, a cyclic ether, ethylenediamine, n-glyme, hexaphosphoric acid triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, pyrrole, 2-methoxyethanol, $AlCl_3$, a monomer providing a conductive polymer as an electrode active material, triethylenephosphoramide, a trialkylphosphine, morpholine, an aryl compound having a carbonyl group, hexamethylphosphoric triamide and a 4-alkylmorpholine, a bicyclic tertiary amine, an oil (see JP-A-62-287580), a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to impart suitability to high-temperature storage, carbonic acid gas may be incorporated to the electrolytic solution. Further, the positive or negative electrode material mixture may contain an electrolytic solution or an electrolyte. For example, addition of the above-mentioned ion conducting polymer or nitromethane or an electrolytic solution to the electrode material mixture is known.

A current collector for the positive or negative electrode may be made of any electron conductor which undergoes no chemical change in an assembled battery. Suitable materials of a current collector for the positive electrode include stainless steel, nickel, aluminum, titanium, carbon; and aluminum or stainless steel with its surface treated with carbon, nickel, titanium or silver. Aluminum or an aluminum alloy is particularly preferred. Suitable materials of a current collector for the negative electrode include stainless steel, nickel, copper, titanium, aluminum, carbon; copper or stainless steel with its surface treated with carbon, nickel, titanium or silver; and an Al—Cd alloy. Copper or a copper alloy is particularly preferred. These materials may be subjected to surface oxidation. It is desirable to provide unevenness on the surface of the current collector by surface treatment. The current collector may have the form of not only a foil but also a film, a sheet, a net, a punched sheet, a lath, a porous body, a foamed body, a fibrous body, and so on. While not limiting, the thickness of the current collector is from 1 to 500 μm.

The battery may have any form, such as a coin, a button, a sheet, a cylinder, a flat shape, an angular shape, and the like. In a coin or button-shaped battery, the positive or negative electrode material mixture is usually used as compressed into a pellet. The thickness and diameter of the pellet are decided according to the battery size. In a sheet, cylindrical or angular-shaped battery, the positive or negative electrode material mixture is usually applied to a current collector, dried, and compressed. General coating techniques, such as reverse roll coating, direct roll coating, blade coating, knife coating, extrusion coating, curtain coating, gravure coating, bar coating, dip coating and squeeze coating, can be used. Blade coating, knife coating and extrusion coating techniques are preferred of them. Coating is preferably carried out at a speed of 0.1 to 100 m/min. Proper selection of a coating method in agreement with the physical properties and drying properties of the electrode material mixture solution will assure satisfactory surface conditions of the resulting coating layer. Coating on both sides of the current collector may be carried out by either successive or simultaneous coating. The electrode material mixture may be applied continuously, intermittently or in stripes. The thickness, length and width of the coating layer are decided according to the battery size. The coating layer preferably has a thickness of 1 to 2000 μm per one side after drying and compression.

Drying or dehydration of the pellet or the sheet is conducted by a generally used means. Hot air drying, vacuum drying, infrared drying, far infrared drying, electron beam drying, and low humidity air drying can be employed either alone or in combination thereof. The drying temperature preferably ranges from 80° to 350° C., particularly from 100° to 250° C. It is preferable for cycle characteristics that the water content of each of the positive electrode material mixture, the negative electrode material mixture, and the electrolyte be not more than 500 ppm, giving the total battery water content of not more than 2000 ppm. Pressing into a pellet or a sheet can be carried out by a generally employed means, preferably by mold pressing or calendering. While not limiting, the pressing pressure is preferably 0.2 to 3 t/cm$^2$. The pressing speed in calendering is preferably 0.1 to 50 m/min. The pressing temperature is preferably from room temperature to 200° C. The ratio of the width of the negative sheet electrode to that of the positive sheet electrode is preferably 0.9 to 1.1, particularly 0.95 to 1.0. The ratio of the content of the positive electrode active material to that of the negative electrode material cannot be specified because it depends on the kinds of compounds used and the mixing ratio in the preparation of the electrode material mixture. That ratio can be optimized with the capacity, cycle characteristics, and safety being taken into consideration.

A positive sheet electrode and a-negative sheet electrode are superimposed one on another with a separator therebetween and inserted into a battery case in a rolled or folded form. The sheets and the case are electrically connected, an electrolytic solution is poured into the case, and the case is sealed with a sealing plate. An explosion-proof valve may be used as a sealing plate. Various known safety elements may be provided in addition to the explosion-proof valve. For example, a fuse, a bimetal, a PTC element, etc. may be used as an element for prevention of over-current. In addition to the explosion-proof valve, countermeasures against an increase in inner pressure can be taken, such as making a cut in a battery case, making a crack in a gasket, making a crack in a sealing plate, or providing a mechanism of cut-off from a lead plate. A protective circuit having a countermeasure against an overcharge or an overdischarge may be incorporated into a charger or be connected to a charger as an independent circuit.

As a countermeasure against an overcharge, the battery can be provided with a system which breaks the current with an increase of the internal pressure. In this case, a compound which increases the internal pressure can be incorporated into the electrode material mixture or the electrolyte. Examples of the compound used for increasing the internal pressure include carbonates, such as $Li_2CO_3$, $LiHCO_3$, $Na_2CO_3$, $NaHCO_3$, $CaCO_3$, and $MgCO_3$.

A battery case and a lead plate are made of an electrically conductive metal, such as iron, nickel, titanium, chromium, molybdenum, copper or aluminum, or an alloy thereof. The cap, case, sheets and lead plates can be welded by a known technique (e.g., direct current or alternating current electric welding, laser welding or ultrasonic welding). Conventionally known compounds or mixtures, such as asphalt, can be used as a sealant for the battery.

Application of the nonaqueous secondary battery of the present invention is not particularly limited. For example, it is mounted in electronic equipment, such as color notebook personal computers, monochromatic notebook personal computers, pen touch personal computers, pocket (palm-top) personal computers, notebook word processors, pocket word processors, electronic book players, mobile phones, wireless phone extensions, pagers, handy terminals, portable facsimiles, portable copiers, portable printers, headphone stereos, video cameras, liquid crystal TV sets, handy cleaners, portable CD, mini disk systems, electrical shavers, machine translation systems, land mobile radiotelephones, transceivers, electrical tools, electronic notebooks, pocket calculators, memory cards, tape recorders, radios, backup powers, memory cards, and so on. For use in daily life, it is useful in automobiles, electrically-powered vehicles, motors, lights, toys, family (home) computers, load conditioners, irons, watches, stroboscopic lamps, cameras, and medical equipment (e.g., pacemakers, hearing aids, and massaging machines). It is also applicable to military equipment and spacecraft equipment. It can be used in combination with solar batteries.

It is desirable to combine the above-described preferred chemical materials and preferred battery constituent parts. Particularly preferred combinations are as follows. The battery contains $Li_xCoO_2$ or $Li_xMn_2O_4$ (wherein $0 \leq x \leq 1$) as a positive electrode active material and acetylene black as an electron conductive agent. The positive electrode current collector is a net, a sheet, a foil, a lath, etc. made up of stainless steel or aluminum. The negative electrode material preferably comprises at least one of metallic lithium, a lithium alloy (e.g., Li—Al), a carbonaceous compound, an oxide (e.g., $LiCoVO_4$, $SnO_2$, $SnO$, $SiO$, $GeO_2$, $GeO$, $SnSiO_3$, and $SnSi_{0.3}Al_{0.1}B_{0.2}P_{0.3}O_{2.8}$, $Sn_{1.0}Al_{0.48}B_{0.52}P_{0.52}Cs_{0.10}O_{3.85}$, $Sn_{1.0}Al_{0.38}B_{0.5}Mg_{0.09}K_{0.10}Ge_{0.09}O_{3.89}$), a sulfide (e.g., $TiS_2$, $SnS_2$, $SnS$, $GeS_2$ and $GeS$), and the like. The negative electrode current collector is a net, a sheet, a foil, a lath, etc. made up of stainless steel or copper. The electrode material mixture containing the positive electrode active material or the negative electrode material may contain a carbon material, such as acetylene black or graphite, as an electron conductive agent. The binder is selected from fluorine-containing thermoplastic compounds, such as polyvinylidene fluoride and polyfluoroethylene, acrylic acid-containing polymers, elastomers, such as styrene-butadiene rubber and an ethylene-propylene terpolymer, and mixtures thereof. The electrolyte contains a combination of cyclic or acyclic carbonates (e.g., ethylene carbonate, diethyl carbonate, and dimethyl carbonate) or ester compounds (e.g., ethyl acetate) and, as a supporting electrolyte, $LiPF_6$ preferably in combination with $LiBF_4$ or $LiCF_3SO_3$. The separator is made of polypropylene, polyethylene or a combination thereof. The shape of the battery may be any of a cylinder, a flat shape, and an angular shape. The battery is preferably provided with a means with which safety can be assured even in case of errors, such as an explosion-proof valve of internal pressure release type, an explosion-proof valve of current shut-down type, and a separator which increases its resistance at high temperatures.

THE BEST MODE FOR CARRYING OUT THE INVENTION

The present invention will now be illustrated in greater detail with reference to Examples, but the invention is not construed as being limited thereto as long as changes or modifications are within the scope of the invention.

SYNTHESIS EXAMPLE 1

Tin monoxide (13.5 g), 3.6 g of silicon dioxide, 0.64 g of magnesium oxide, and 0.69 g of boron oxide were dry blended. The blend was put in an alumina-made crucible, heated in an argon atmosphere up to 1000° C. at a rate of temperature rise of 15° C./min, and calcined at 1200° C. for 10 hours, followed by cooling to room temperature at a rate of temperature drop of 10° C./min. The calcined product was taken out of the kiln, roughly crushed, and finely ground in a jet mill to obtain $SnSiO_{0.6}Mg_{0.2}B_{0.0}O_{2.7}$ (compound 1-A) having an average particle size of 4.5 μm. The compound exhibited a broad band having a peak at around 28° in terms of 2θ value in X-ray diffractometry using CuKα rays. No crystalline diffraction line was observed in the 2θ value range of 40 to 70°.

The following compounds were obtained by mixing stoichiometric amounts of raw materials, calcining, and grinding in the same manner as described-above.

$SnSi_{0.8}Mg_{0.2}O_{2.8}$ (compound 1-B)
$SnSi_{0.6}Al_{0.2}Mg_{0.2}O_{2.7}$ (compound 1-C)
$SnSi_{0.6}P_{0.2}Mg_{0.2}O_{2.9}$ (compound 1-D)
$SnSi_{0.6}Al_{0.1}B_{0.2}Mg_{0.1}O_{2.75}$ (compound 1-E)
$SnSi_{0.5}P_{0.1}B_{0.1}Mg_{0.3}O_{2.7}$ (compound 1-F)

EXAMPLE 1-1

Eighty-eight weight percents of compound 1-A synthesized in Synthesis Example 1 as a negative electrode material and 6 wt % of flaky graphite were mixed, and 4 wt % of an aqueous dispersion of polyvinylidene fluoride and 1 wt % of carboxymethyl cellulose as binders and 1 wt % of lithium, acetate were added thereto. The mixture was kneaded with water as a medium to prepare a slurry. The slurry was applied to both sides of a 18 μm thick copper foil by extrusion coating to prepare negative electrode (a).

A slurry was prepared by kneading 94.5 wt % of $\alpha\text{-}Al_2O_3$ (average particle size: 1 μm), 4.5 wt % of polyvinylidene fluoride, and 1 wt % of carboxymethyl cellulose with water as a medium. The resulting slurry was applied to negative electrode (a) to prepare negative electrode (b).

After drying, negative electrodes (a) and (b) each were compressed by means of a calender press and cut to prescribed width and length to prepare negative sheet electrodes (a) and (b) of band form, respectively. Negative sheet electrodes (a) and (b) had a thickness of 78 μm and 100 μm, respectively.

Eighty-seven weight percents of $LiCoO_2$ as a positive electrode material, 6 wt % of flaky graphite, 3 wt % of acetylene black and, as binders, 3 wt % of an aqueous dispersion of polytetrafluoroethylene and 1 wt % of sodium polyacrylate were kneaded with water as a medium to prepare a slurry. The resulting slurry was applied to both sides of a 20 μm thick aluminum foil in the same manner as described above to prepare positive electrode (a).

$\alpha\text{-}Al_2O_3$ (average particle size: 1 μm) (94.5 wt %), polyvinylidene fluoride (4.5 wt %), and carboxymethyl cellulose (1 wt %) were kneaded with water as a medium to prepare a slurry, and the slurry was applied to positive electrode (a) to prepare positive electrode (b). Positive electrodes (a) and (b) each were dried, pressed, and cut to obtain positive sheet electrodes (a) and (b), respectively. Positive sheet electrodes (a) and (b) had a thickness of 250 μm and 265 μm, respectively.

Battery A (for comparison) and battery B (invention) were assembled according to the following method using a combination of negative sheet electrode (a) and positive sheet electrode (a) and a combination of negative sheet electrode (b) and positive sheet electrode (b) respectively. A nickel lead plate and an aluminum lead plate were welded onto the end of the negative sheet electrode and the positive sheet electrode, respectively, and the sheet electrodes were dried by heating at 150° C. for 2 hours in a dry air atmosphere having a dew point of −40° C. or lower.

Figure 1:
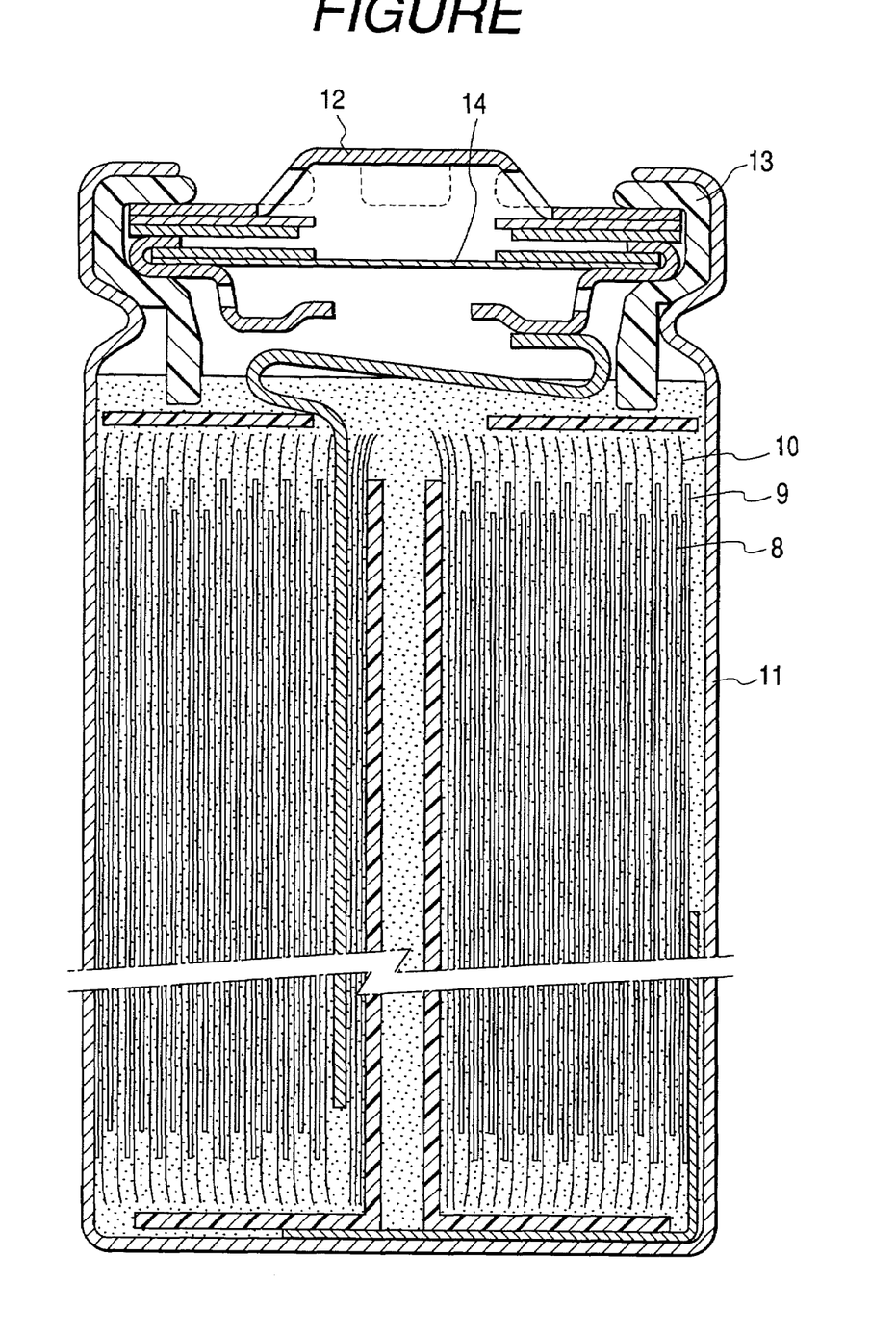
FIG. 1 illustrates a cross section of a cylindrical battery used in the Examples.

The dried positive sheet electrode (8), a finely porous polypropylene film separator (CELGARD® 2400) (10), the dried negative sheet electrode (9), and the separator (10) were laid one on another in this order and rolled up into a cylinder by means of a winder.

The roll was put in a nickel-plated iron-made sealed-end battery case (11) which also served as a negative electrode terminal, and an electrolyte comprising a 2:8 (by volume) mixed solvent of ethylene carbonate and diethyl carbonate, 0.95 mol/l of $LiPF_6$, and 0.05 mol/l of $LiBF_4$ was poured into the case. A cap (12) having a positive electrode terminal was fitted to the open top via a gasket (13) to prepare a cylindrical battery. The positive electrode terminal (12) had previously been connected to the positive sheet electrode (8), and the battery case (11) to the negative sheet electrode (9), respectively, via respective lead terminals. The cross section of the resulting cylindrical battery is shown in FIG. 1, in which reference numeral (14) indicates an explosion-proof valve.

Ten battery A's (comparison) and ten battery B's (invention) were made. Each battery was charged at a current of 1 $mA/cm^2$ to a voltage of 4.15 V and stored at 60° C. for 3 weeks. After the 3-week storage, the open circuit voltage of the battery was measured to obtain the following results.

| Battery | Open Circuit Voltage | |
| --- | --- | --- |
| No. | Battery A (Comparison) | Battery B (Invention) |
| 1 | 1.03 | 4.10 |
| 2 | 1.05 | 4.09 |
| 3 | 0.90 | 4.10 |
| 4 | 0.51 | 4.10 |
| 5 | 0.03 | 4.11 |
| 6 | 1.06 | 4.09 |
| 7 | 1.00 | 4.09 |
| 8 | 0.72 | 4.10 |
| 9 | 1.09 | 4.11 |
| 10 | 0.09 | 4.10 |

It is seen from the above results that the batteries of the present invention have stable performance, showing a reduced drop in voltage during storage.

EXAMPLE 1-2

Three hundred battery A's and 300 battery B's were made in the same manner as in Example 1-1. Each battery was charged to 4.15 V, and the number of batteries rejected for an insufficient charge was counted. Six battery A's were found defective, while none of battery B's was defective, obviously showing improvement in reject rate.

EXAMPLE 1-3

The same experiment as in Example 1-1 was carried out, except for replacing negative electrode material 1-A as used in Example 1-1 with each of 1-B to 1-F. The results obtained were similar to those of Example 1-1.

EXAMPLE 1-4

Battery C was prepared by using a combination of negative sheet electrode (b) and positive sheet electrode (a) of Example 1-1. Battery D was prepared by using a combination of negative sheet electrode (a) and positive sheet electrode (c) which was prepared in the same manner as for positive sheet electrode (b), except for changing the thickness of the protective layer so as to give a sheet thickness of 280 μm. The same experiment as in Example 1-1 was carried out using the resulting batteries. It was found that these batteries exhibit stable performance with a small drop in voltage during storage similarly to battery B. However, both battery C and battery D had a slightly lower open circuit voltage than battery B.

EXAMPLE 2-1

Eighty-eight weight percents of compound 1-A synthesized in Synthesis Example 1 as a negative electrode material and 6 wt % of flaky graphite were mixed, and 4 wt % of an aqueous dispersion of polyvinylidene fluoride and 1 wt % of carboxymethyl cellulose as binders and 1 wt % of lithium acetate were added thereto. The mixture was kneaded with water as a medium to prepare a slurry. The slurry was applied to both sides of a 18 μm thick copper foil by extrusion coating to prepare negative electrode (a).

Negative electrodes (b-1), (b-2), (b-3) and (b-4) were prepared by coating on negative electrode (a) with a slurry prepared by kneading a mixture of conductive particles, etc. having a mixing ratio shown in Table 1 with water as a medium.

After drying, negative electrodes (a) and (b-1) to (b-4) each more compressed by means of a calender press and cut to prescribed width and length to prepare negative sheet electrodes (a) and (b-1) to (b-4), respectively. Negative sheet electrode (a) and negative sheet electrodes (b-1 to b-4) had a thickness of 78 μm and 100 μm, respectively.

Eighty-seven weight percents of $LiCoO_2$ as a positive electrode material, 6 wt % of flaky graphite, 3 wt % of acetylene black and, as binders, 3 wt % of an aqueous dispersion of polytetrafluoroethylene and 1 wt % of sodium polyacrylate were kneaded with water as a medium to prepare a slurry. The resulting slurry was applied to both sides of a 20 μm thick aluminum foil in the same manner as described above to prepare positive electrode (a).

Positive electrodes (b-1), (b-2), (b-3) and (b-4) were prepared by coating on positive electrode (a) with a slurry of conductive particles, etc. having a composition shown in Table 1 in the same manner as for the negative electrodes.

Positive electrodes (a) and (b-1) to (b-4) were dried, pressed, and cut to prepare positive sheet electrodes (a) and (b-1) to (b-4), respectively. Positive sheet electrode (a) and (b-1 to 4) had a thickness of 250 μm and 265 λm, respectively.

TABLE 1

| | Mixing Ratio (Solid Base; wt %) | | | |
|---|---|---|---|---|
| | b-1 | b-2 | b-3 | b-4 |
| Conductive particles | | | | |
| Flaky graphite (3.5 μm) | 92 | 82 | 50 | 0 |
| Acetylene black (0.2 μm) | 0 | 8 | 0 | 0 |
| Nickel powder (2.0 μm) | 0 | 0 | 0 | 92 |
| α-Alumina | 0 | 0 | 41 | 0 |
| Polyvinylidene fluoride | 7 | 8 | 8 | 7 |
| Carboxymethyl cellulose | 1 | 2 | 1 | 1 |
| Total | 100 | 100 | 100 | 100 |

Battery A (for comparison) and battery B (invention) were prepared in the same manner as in Example 1-1, except for using combinations of the above-prepared sheet electrodes as shown in Table 2 below.

Ten samples each of battery A (comparison) and batteries B-1 to B-8 (invention) were made. Each battery was charged at 1 $mA/cm^2$ to 4.15 V and stored at 60° C. for 3 weeks. After the 3-week storage, the open circuit voltage was measured. The results are shown in Table 2.

TABLE 2

| Battery Type | Negative Sheet Electrode | Positive Sheet Electrode | Avg. Open Circuit Voltage (V) | Standard Deviation of Voltage Variation |
|---|---|---|---|---|
| A (comparison) | a | a | 0.72 | 0.33 |
| B-1 (invention) | b-1 | b-1 | 4.10 | 0.01 |
| B-2 (invention) | b-2 | b-2 | 4.10 | 0.01 |
| B-3 (invention) | b-3 | b-3 | 4.11 | 0.01 |
| B-4 (invention) | b-4 | b-4 | 4.09 | 0.02 |
| B-5 (invention) | b-2 | a | 4.10 | 0.01 |
| B-6 (invention) | b-3 | a | 4.11 | 0.01 |
| B-7 (invention) | a | b-2 | 4.10 | 0.01 |
| B-8 (invention) | a | b-3 | 4.11 | 0.01 |

It is seen from the above results that the batteries according to the present invention have stable performance, showing a reduced drop in voltage during storage.

EXAMPLE 2-2

Three hundred samples each of batteries A and B-1 to B-8 of Example 2-1 were made and charged to 4.15 V. The number of batteries rejected for an insufficient charge was counted. Six battery A's were found defective, while none of batteries B-1 through B-8's was defective, obviously showing improvement in reject rate.

EXAMPLE 2-3

The same experiment as in Example 2-1 was carried out, except for replacing negative electrode material 1-A as used in Example 2-1 with each of 1-B to 1-F. The results obtained were similar to those of Example 2-1.

EXAMPLE 2-4

Negative sheet electrodes (c-1) and (c-2) were prepared in the same manner as for negative sheet electrodes (b-2) and (b-3) of Example 2-1, except for changing the thickness of the protective layer to 85 μm. Batteries C-1 and C-2 were prepared by using a combination of the resulting negative sheet electrode and positive sheet electrode (a). An experiment was conducted by using batteries C-1 and C-2 in the same manner as in Example 2-1. It was found that these batteries had stable performance with a reduced drop in voltage during storage similarly to battery B.

EXAMPLE 3-1

Eighty-eight weight percents of compound 1-A synthesized in Synthesis Example 1 as a negative electrode material and 6 wt % of flaky graphite were mixed, and 4 wt % of an aqueous dispersion of polyvinylidene fluoride and 1 wt % of carboxymethyl cellulose as binders and 1 wt % of lithium acetate were added thereto. The mixture was kneaded with water as a medium to prepare a slurry. The slurry was applied to both sides of a 18 μm thick copper foil by extrusion coating to prepare negative electrode (a).

Negative electrode (b) was prepared by coating on negative electrode (a) with a slurry prepared by kneading 94.5 wt % of lithium fluoride, 4.5 wt % of polyvinylidene fluoride, and 1 wt % of carboxymethyl cellulose with water as a medium.

After drying, negative electrodes (a) and (b) were compressed by means of a calender press and cut to prescribed width and length to prepare negative sheet electrodes (a) and (b), respectively. Negative sheet electrodes (a) and (b) had a thickness of 78 μm and 100 μm, respectively.

Eighty-seven weight percents of $LiCoO_2$ as a positive electrode material, 6 wt % of flaky graphite, 3 wt % of acetylene black and, as binders, 3 wt % of an aqueous dispersion of polytetrafluoroethylene and 1 wt % of sodium polyacrylate were kneaded with water as a medium to prepare a slurry. The resulting slurry was applied to both sides of a 20 μm thick aluminum foil in the same manner as described above to prepare positive electrode (a).

Positive electrode (b) was prepared by coating on positive electrode (a) with a slurry prepared by kneading 94.5 wt % of lithium fluoride, 4.5 wt % of polyvinylidene fluoride, and 1 wt % of carboxymethyl cellulose with water as a medium.

Positive electrodes (a) and (b) were dried, pressed, and cut to obtain positive sheet electrodes (a) and (b), respectively. Positive sheet electrodes (a) and (b) had a thickness of 250 μm and 265 μm, respectively.

Battery A (for comparison) and battery B (invention) were prepared in the same manner as in Example 1-1 by using a combination of negative sheet electrode (a) and positive sheet electrode (a) and a combination of negative sheet electrode (b) and positive sheet electrode (b), respectively.

Ten samples each of battery A (comparison) and battery B (invention) were made. Each battery was charged at 1 $mA/cm^2$ to 4.15 V and stored at 60° C. for 4 weeks. After the 4-week storage, the open circuit voltage was measured. The results are shown below.

| Battery | Open Circuit Voltage | |
|---|---|---|
| No. | Battery A (Comparison) | Battery B (Invention) |
| 1 | 0.97 | 4.11 |
| 2 | 0.89 | 4.06 |
| 3 | 0.92 | 4.08 |
| 4 | 0.87 | 4.12 |
| 5 | 1.01 | 4.10 |
| 6 | 0.06 | 4.11 |
| 7 | 0.35 | 4.04 |
| 8 | 0.21 | 4.11 |
| 9 | 0.87 | 4.09 |
| 10 | 0.38 | 4.12 |

It is seen from the above results that the batteries according to the present invention exhibit stable performance with an obviously reduced drop in voltage during storage.

EXAMPLE 3-2

Three hundred samples each of batteries A and B of Example 3-1 were made and charged to 4.15 V. The number of batteries rejected for an insufficient charge was counted. Nine battery A's were found defective, while there was no defective battery B, obviously showing improvement in reject rate.

EXAMPLE 3-3

The same experiment as in Example 3-1 was carried out, except for replacing negative electrode material 1-A as used in Example 3-1 with each of 1-B to 1-F. The results obtained were similar to those of Example 3-1.

EXAMPLE 3-4

Battery C was prepared by using a combination of negative sheet electrode (b) and positive sheet electrode (a) of Example 3-1. Battery D was prepared by using a combination of negative sheet electrode (a) and positive sheet electrode (c) which was prepared in the same manner as for positive sheet electrode (b), except for changing the thickness of the protective layer so as to give a sheet thickness of 280 μm. The same experiment as in Example 3-1 was carried out using each of the resulting batteries. It was found that these batteries exhibit stable performance with a reduced drop in voltage during storage similarly to battery B. However, both battery C and battery D had a slightly lower open circuit voltage than battery B.

EXAMPLE 3-5

Prescribed amounts of tin monoxide, alumina, boron oxide, tin pyrophosphate, and magnesium fluoride were dry blended. The blend was put in an alumina-made crucible, heated in an argon atmosphere up to 1000° C. at a rate of temperature rise of 15° C./min, and calcined for 10 hours, followed by cooling to room temperature at a rate of temperature drop of 10° C./min. The calcined product was taken out of the kiln, roughly crushed, and finely ground in a jet mill to obtain powder having an average particle size of 6.5 82 m. The product exhibited a broad band having a peak at around 28° in terms of 2θ value in X-ray diffractometry using CuKα rays with no crystalline diffraction lines in the 2θ value range of 40 to 70°. As a result of elementary analysis, the product was identified to be $SnAl_{0.1}B_{0.5}P_{0.5}Mg_{0.1}F_{0.2}O_{3.15}$ (compound G).

Negative sheet electrode (5a) was prepared in the same manner as for negative sheet electrode (a) of Example 3-1, except for replacing compound 1-A as used in Example 3-1 with compound G. Negative sheet electrode 5b was prepared in the same manner as for negative sheet electrode (b) having a protective layer. Battery 5a and battery 5b were prepared using a combination of negative sheet electrode (5a) or (5b) and positive sheet electrode (a) of Example 3-1. The same experiment as in Example 3-1 was carried out to obtain the following results.

| Battery | Open Circuit Voltage | |
|---|---|---|
| No. | Battery A (Comparison) | Battery B (Invention) |
| 1 | 0.53 | 4.13 |
| 2 | 0.46 | 4.12 |
| 3 | 0.48 | 4.11 |
| 4 | 0.60 | 4.12 |
| 5 | 0.73 | 4.10 |
| 6 | 0.58 | 4.11 |
| 7 | 0.05 | 4.09 |
| 8 | 0.18 | 4.12 |
| 9 | 0.67 | 4.11 |
| 10 | 0.18 | 4.10 |

It is seen from the above results that the batteries according to the present invention exhibit stable performance with an obviously reduced drop in voltage during storage.

EXAMPLE 4-1

Eighty-eight weight percents of compound 1-A synthesized in Synthesis Example 1 as a negative electrode material were mixed with 6 wt % of flaky graphite, and 4 wt % of an aqueous dispersion of polyvinylidene fluoride and 1 wt % of carboxymethyl cellulose as binders and 1 wt % of lithium acetate were added thereto. The mixture was kneaded with water as a medium to prepare a slurry. The slurry was applied to each side of a 18 μm thick copper foil by extrusion coating to obtain a total dry thickness of 90 μm to prepare negative electrode (a).

Negative electrode (b) was prepared by coating at both sides of negative electrode (a) with a coating composition containing 75 wt % of Chemipal W700 (polyethylene fine particles prepared by Mitsui Petrochemical Industries, Ltd.; average particle size: 1 μm; MFT: 115° C.) to obtain a total dry thickness of 7 μm.

Negative electrode (c) was prepared by coating at both sides of negative electrode (a) with a coating composition containing 75 wt % of. Chemipal W700 and 25 wt % of $ZrO_2$ to obtain a total dry thickness of 7 μm.

After drying, negative electrodes (a), (b) and (c) were compressed by means of a calender press and cut to prescribed width and length to prepare negative sheet electrodes (a), (b), and (c), respectively.

Eighty-seven weight percents of $LiCoO_2$ as a positive electrode material, 6 wt % of flaky graphite, 3 wt % of acetylene black and, as binders, 3 wt % of an aqueous dispersion of polytetrafluoroethylene and 1 wt % of sodium polyacrylate were kneaded with water as a medium to prepare a slurry. The resulting slurry was applied to each sides of a 20 μm thick aluminum foil in the same manner as described above to obtain a total dry thickness of 290 μm to prepare positive electrode (a).

Positive electrode (b) was prepared by coating at both sides of positive electrode (a) with Chemipal W700 to obtain a total dry thickness of 7 μm.

Positive electrode (c) was prepared by coating at both sides of positive electrode (a) with a coating composition containing 75 wt % of Chemipal W700 and 25 wt % of $ZrO_2$ to obtain a total dry thickness of 7 μm.

Positive electrodes (a), (b), and (c) were dried, pressed, and cut to obtain positive sheet electrodes (a), (b), and (c), respectively.

Battery AS (comparison), battery BS (invention), and battery CS (invention) were prepared by using a combination of negative sheet electrode (a) and positive sheet electrode (a), a combination of negative sheet electrode (b) and positive electrode sheet (b), and a combination of negative sheet electrode (c) and positive sheet electrode (c), respectively, in the same manner as in Example 1-1.

Batteries B and C were prepared in the same manner as for batteries BS and CS, respectively, except that the separator was not used.

Ten samples each of battery AS (comparison) and batteries BS, CS, B, and C (invention) were made. Each battery was charged at 1 mA/cm$^2$ to 4.15 V and stored at 60° C. for 3 weeks. After the 3-week storage, the open circuit voltage was measured. The results are shown below.

TABLE 3

| Battery | Open Circuit Voltage After 3 Weeks 0.99 |
|---|---|
| AS (comparison) | 3.99 |
| BS (invention) | 4.10 |
| CS (invention) | 4.09 |
| B (invention) | 4.07 |
| C (invention) | 4.07 |

It is seen from the above results that the batteries according to the present invention exhibit stable performance with an obviously reduced drop in voltage during storage.

EXAMPLE 4-2

A hundred samples each of batteries AS, BS CS, B, and C of Example 4-1 were made and charged to 4.15 V. The number of rejected batteries was counted. Three battery AS's were found defective, while none of batteries BS, CS, B, and C was found defective, obviously showing improvement in reject rate.

EXAMPLE 4-3

Batteries were prepared in the same manner as for batteries AS, BS, and B of Example 4-1, except for replacing negative electrode material 1-A as used in Example 4-1 with each of 1-B to 1-F, and tested in the same manner as in Example 4-1. The results obtained were substantially the same as those of Example 4-1.

EXAMPLE 4-4

Batteries DS and D were prepared in the same manner as for batteries BS and B of Example 4-1, except for replacing negative sheet electrode (b) with negative sheet electrode (a). Battery F was prepared in the same manner as for battery C, except for replacing positive sheet electrode (c) with positive sheet electrode (d) which was prepared in the same manner as for positive sheet electrode (c) except for changing the thickness of the protective layer so as to give a sheet thickness of 280 μm. The same experiment as in Example 4-1 was carried out using each of batteries DS, D, and F. It was found that these batteries exhibit stable performance with a reduced drop in voltage during storage similarly to battery B.

EXAMPLE 4-5

Of those samples of battery AS, BS, CS, DS, B, C, D, and F which functioned normally in charging and discharging, 5 samples were selected from each kind. Each battery was charged to 4.4 V and short-circuited externally. All the five comparative battery AS's burst the cap, and the electrolytic solution spouted from the break of the cap together with gas. Such the phenomenon did not occur in any samples of batteries BS, CS, DS, B, C, D and F according to the present invention.

SYNTHESIS EXAMPLE 2

Tin pyrophosphate (10.3 g), 6.7 g of tin monoxide, 1.7 g of diboron trioxide, 1.6 g of cesium carbonate, and 0.7 g of germanium dioxide were dry blended and put in an alumina crucible. A 80/1 (by volume) mixed gas of $H_2O/H_2$ diluted with argon gas was introduced. The mixture was heated up to 1000° C. at a rate of temperature rise of 15° C./min. At this time, the oxygen partial pressure was 11.2 in terms of $-\log(PO_2/atm)$. The mixture was calcined at that temperature for 12 hours, followed by cooling to room temperature at a rate of temperature drop of 10° C./min. The calcined product taken out of the kiln, which was uniform, yellow, and transparent, was roughly crushed and finely ground in a jet mill to obtain powder having an average particle size of 7.0 μm (compound 2-A). The compound exhibited a broad band having a peak at around 28° in terms of 2θ value in X-ray diffractometry using CuKα rays. No crystalline diffraction line was observed in the 2θ value range of 40 to 70°.

EXAMPLE 5-1

Eighty-six parts by weight of compound 2-A synthesized in Synthesis Example 2 as a negative electrode material were mixed with 3 parts by weight of acetylene black and 6 parts by weight of graphite as electron conductive agents. Four parts by weight of polyvinylidene fluoride and 1 part by weight of carboxymethyl cellulose were added thereto as binders. The mixture was kneaded with water as a medium to prepare a slurry of a negative electrode material mixture. The slurry was applied to both sides of a 10 μm thick copper foil by extrusion coating and dried to prepare a negative electrode.

Eighty-eight parts by weight of a-alumina, 9 parts by weight of graphite, and 3 parts by weight of carboxymethyl cellulose were kneaded with water as a medium to prepare a slurry for a protective layer. The slurry was applied to the negative (sheet) electrode, dried, and compressed by a calender press to prepare negative sheet electrode (b) of a band form. Separately, the negative electrode with no protective layer slurry applied was compressed by a calender press to prepare negative sheet electrode (a).

A nickel lead plate was spot-welded to the negative electrode sheet precursor followed by dehydration-drying at 230° C. for 30 minutes in air having a dew point of −40° C. or less.

A lithium foil (purity: 99.8%) having a thickness of 35 μm was cut into of 4 mm×50 mm, and the cut pieces was adhered to the negative sheet electrode over its whole length at 10 mm intervals against the length direction of the lithium strips forming right angles against the length direction of the sheet electrode.

Eighty-five parts by weight of $LiCoO_2$ as a positive electrode active material were mixed with 3 parts by weight of acetylene black and 5 parts of graphite as electron conductive agents. Three parts of Nipol 820B (produced by Nippon Zeon Co., Ltd.), 1 part by weight of carboxymethyl cellulose, and 2 parts by weight of polyvinylidene fluoride were added as binders, and 1 part by weight of sodium hydrogencarbonate was also added thereto. The mixture was kneaded with water as a medium to prepare a slurry of a positive electrode material mixture.

The resulting slurry was applied to the both sides of a 20 μm thick aluminum foil by extrusion coating, dried, and compression-formed by means of a calender press to form positive sheet electrode (a) having a band form.

Forty-nine parts by weight of α-alumina, 50 parts by weight of titanium oxide, and 1 part by weight of carboxymethyl cellulose were kneaded with water as a medium to prepare a slurry for a protective layer. The resulting slurry was applied to the positive (sheet) electrode (before compressive forming), dried, and compressed by a calender press to obtain positive sheet electrode (b). A lead plate made of aluminum was welded to the end of the positive sheet electrode and dehydrated at 230° C. for 30 minutes in dry air having a dew point of −40° C. or less.

Battery A (comparison) and battery B (invention) were prepared by using a combination of negative sheet electrode (a) and positive sheet electrode (a) and a combination of negative sheet electrode (b) and positive sheet electrode (b), respectively, in the same manner as in Example 1-1.

Each of the resulting batteries was subjected to a constant-current constant-voltage charge at 0.2 A to an open circuit voltage of 3.0 V and then stored in a thermostat at 50° C. for 2 weeks. After the storage, the battery was further charged to 4.1 V and stored at 60° C. for 3 weeks. After the 3-week storage, the open circuit voltage was measured to obtain the following results.

| | Open Circuit Voltage (V) | |
|---|---|---|
| Battery No. | Battery A (Comparison) | Battery B (Invention) |
| 1 | 0.41 | 4.08 |
| 2 | 0.32 | 4.09 |
| 3 | 0.36 | 4.07 |
| 4 | 0.03 | 4.08 |
| 5 | 0.29 | 4.08 |
| 6 | 0.37 | 4.09 |
| 7 | 0.40 | 4.09 |
| 8 | 0.79 | 4.07 |
| 9 | 0.36 | 4.08 |
| 10 | 0.25 | 4.08 |

It is seen from the above results that the batteries according to the present invention are stable in performance, showing an obviously reduced drop in voltage during storage.

EXAMPLE 5-2

Three hundred samples each of batteries A and B of Example 5-1 were made and each charged to 4.1 V. Thirteen battery A's were found defective in charging, while none of batteries B's was found defective, obviously showing improvement in reject rate.

INDUSTRIAL APPLICABILITY

In a nonaqueous secondary battery comprising a positive electrode and a negative electrode which are capable of reversibly intercalating and deintercalating lithium, a nonaqueous electrolyte containing a lithium salt, and a separator, a nonaqueous secondary battery having a high discharge voltage, a large discharge capacity, and stability against storage can be produced in a stable manner by providing at least one layer on the negative electrode and/or the positive electrode.

The invention claimed is:

1. A nonaqueous secondary battery comprising a positive electrode containing a material capable of reversibly intercalating and deintercalating lithium, a negative electrode containing a composite oxide containing tin represented by formula (3):

$$SnM^3{}_c M^4{}_d O_t \qquad (3)$$

wherein $M^3$ represents at least two elements selected from the group consisting of Al, B, P, and Si; $M^4$ represents at least one element selected from the group consisting of elements of groups 1 to 3 of the Periodic Table, and halogen elements; c represents a number of from 0.2 to 2; d represents a number of from 0.01 to 1; provided that $0.2<c+d<2$; and t represents a number of from 1 to 6, a nonaqueous electrolyte containing a lithium salt, and a separator, wherein at least the positive electrode has at least one protective layer comprising organic fine particles and inorganic fine particles.

2. The nonaqueous secondary battery as in claim 1, wherein said protective layer is formed on both of the positive electrode and negative electrode.

3. The nonaqueous secondary battery as in claim 1, wherein said protective layer comprises fine particles of water-insoluble or sparingly water-soluble alkali metal salt or alkaline earth metal salt, and at least two kinds of binders.

4. The nonaqueous secondary battery as in claim 1, wherein said protective layer has substantially no electrical conductivity.

5. The nonaqueous secondary battery as in claim 1, wherein said protective layer has electrical conductivity.

6. The nonaqueous secondary battery as in claim 1, wherein said protective layer contains particles having substantially no electrical conductivity.

7. The nonaqueous secondary battery as in claim 1, wherein said protective layer contains particles which are electrically conductive.

8. The nonaqueous secondary battery as in claim 1, wherein said protective layer contains particles which are inorganic chalcogenide particles.

9. The nonaqueous secondary battery as in claim 8, wherein said inorganic chalcogenide particles contain at least one inorganic oxide selected from the group consisting of oxide of sodium, potassium, magnesium, calcium, strontium, zirconium, aluminum, and silicon.

10. The nonaqueous secondary battery as in claim 9, wherein said inorganic oxide is selected from the group consisting of alumina, silicon dioxide and zirconia.

11. The nonaqueous secondary battery as in claim 1, wherein said protective layer contains electrically conductive particles selected from the group consisting of metal powders and carbon particles.

12. The nonaqueous secondary battery as in claim 11, wherein said electrically conductive particles are carbon particles.

13. The nonaqueous secondary battery as in claim 3, wherein said water-insoluble or sparingly water-soluble fine particles contained in said protective layer are an alkali metal salt.

14. The nonaqueous secondary battery as in claim 3, wherein said water-insoluble or sparingly water-soluble fine particles contained in said protective layer are an alkaline earth metal salt.

15. The nonaqueous secondary battery as in claim 13, wherein said water-insoluble or sparingly water-soluble fine particles are a lithium salt.

16. The nonaqueous secondary battery as in claim 1, wherein said protective layer has a thickness of from 1 μm to 40 μm.

17. The nonaqueous secondary battery as in claim 1, wherein said protective layer contains electrically conductive particles in an amount of from 2.5 to 96% by weight.

18. The nonaqueous secondary battery as in claim 1, wherein said nonaqueous electrolyte contains at least one carbonic ester.

19. The nonaqueous secondary battery as in claim 1, wherein said protective layer contains polyethylene fine particles and inorganic particles of $ZrO_2$.

* * * * *